(12) United States Patent
Bender et al.

(10) Patent No.: US 6,366,778 B1
(45) Date of Patent: Apr. 2, 2002

(54) SYNCHRONIZATION OF FORWARD LINK BASE STATION POWER LEVELS DURING HANDOFF BETWEEN BASE STATION SECTORS IN A MOBILE RADIO COMMUNICATION SYSTEM

(75) Inventors: Paul E. Bender; Roberto Padovani, both of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/360,296

(22) Filed: Jul. 22, 1999

Related U.S. Application Data
(60) Provisional application No. 60/075,211, filed on Feb. 19, 1998.

(51) Int. Cl.[7] ................................................. H04Q 7/20
(52) U.S. Cl. ...................................... 455/442; 455/522
(58) Field of Search ................................. 455/445, 522, 455/561, 69; 370/331

(56) References Cited

U.S. PATENT DOCUMENTS

| | | | | |
|---|---|---|---|---|
| 5,625,876 A | * | 4/1997 | Gilhousen et al. | ......... 455/33.3 |
| 5,893,035 A | * | 4/1999 | Chen | ........................... 455/522 |
| 6,108,548 A | * | 8/2000 | Furukawa et al. | .......... 455/442 |

* cited by examiner

Primary Examiner—Nguyen T. Vo
Assistant Examiner—Nghi Ly
(74) Attorney, Agent, or Firm—Philip Wadsworth; Kent D. Baker; Bruce W. Greenhaus

(57) ABSTRACT

A method and apparatus for controlling the transmit power levels of first and second base station transceivers, wherein the first and second base station transceivers are respectively associated with first and second sectors of a cell. The received signal strength of a communication signal arriving at the mobile station is initially determined. A power control value that is based on the received signal strength is then transmitted from the mobile station to the first and second base station transceivers. A first received power control value is next generated by attempting to receive the transmitted power control value at the first base station transceiver, and a second received power control value is generated by attempting to receive the transmitted power control value at the second base station transceiver. A common transmit power value is calculated at a base station controller for the first and second base station transceivers when the first and second received power control values are unequal. The communication signal is then transmitted from the first and second base station transceivers in accordance with the common transmit power value.

10 Claims, 13 Drawing Sheets

SYNCHRONIZATION OF FORWARD LINK BASE STATION POWER LEVELS DURING HANDOFF BETWEEN BASE STATION SECTORS IN A MOBILE RADIO COMMUNICATION SYSTEM

This application claims priority from provisional U.S. Serial No. 60/075,211, filed Feb. 19, 1998 which is pending.

BACKGROUND OF THE INVENTION

I. Related Applications

This application claims priority from International Patent Application Serial No. US99/03683, filed Feb. 19, 1999, which is pending and which claims priority from U.S. Provisional Patent Application Serial No. 60/075,211, filed Feb. 19, 1999.

II. Field of the Invention

The present invention relates to communications in general, and to synchronized power control in a multiple access communications system in particular.

III. Description of the Related Art

The use of code division multiple access (CDMA) modulation techniques is but one of several techniques for facilitating communications in which a large number of system users are present. Although other techniques such as time division multiple access (TDMA), frequency division multiple access (FDMA) and AM modulation schemes such as amplitude companded single sideband (ACSSB) are known, CDMA has significant advantages over these other modulation techniques. The use of CDMA techniques in a multiple access communications system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention and the disclosure of which is incorporated by reference herein.

In the patent just mentioned, a multiple access technique is disclosed wherein a large number of mobile telephone system users, each having a transceiver, communicate through satellite repeaters or terrestrial base stations (also known as cell base stations, or cell-sites) using CDMA spread spectrum communication signals. In using CDMA communications, the frequency spectrum can be reused multiple times thereby permitting an increase in system user capacity. The use of CDMA techniques results in a much higher spectral efficiency than can be achieved using other multiple access techniques.

In conventional cellular telephone systems that use analog FM modulation, the available frequency band is divided into channels typically 30 KHz in bandwidth. The system service area is divided geographically into cells of varying size. The available frequency channels are divided into sets with each set usually containing an equal number of channels. The frequency sets are assigned to cells in such a way as to minimize the possibility of co-channel interference.

Handoff schemes in conventional cellular systems are intended to allow a call or other type of connection for example a data link, to continue when a mobile station crosses the boundary between two cells. The handoff from one cell to another is initiated when the receiver in the cell base station handing off the call or connection notices that the received signal strength from the mobile station falls below a predetermined threshold value. When the signal level falls below the predetermined threshold value, the base station asks the system controller to determine whether a neighboring base station receives the mobile station signal with better signal strength than the current base station.

The system controller responds to the inquiry of the current base station by sending messages to the neighboring base stations with a handoff request. The neighboring base stations then use special scanning receivers to look for the signal from the mobile station on the specified channel. Should one of the neighboring base stations report an adequate signal strength to the system controller, a handoff is attempted.

In a conventional system, a call is discontinued if the handoff to the new base station is unsuccessful. There are many reasons why a handoff failure may occur. For example, if there is no idle channel available in the neighboring cell for communicating the call, handoff fails. Likewise, if a neighboring base station reports hearing the mobile station, but in fact really hears another mobile unit using the same channel in a completely different cell, handoff fails. Handoff can also fail where the mobile station fails to receive a command signal to switch to the new channel in the neighboring cell.

Yet another handoff problem in conventional cellular systems occurs when the mobile unit approaches the border between two cells. In this situation the signal level of the mobile station tends to fluctuate at both base stations, thereby creating a "ping-ponging" effect. Repeated requests are made to handoff the call back and forth between two neighboring base stations.

In U.S. Pat. No. 5,101,501, entitled "METHOD AND SYSTEM FOR PROVIDING A SOFT HANDOFF IN COMMUNICATIONS IN A CDMA CELLULAR TELEPHONE SYSTEM," assigned to the assignee of the present invention, the disclosure of which is incorporated by reference herein, a method and system are disclosed for providing communication with the mobile station through more than one cell base station during handoff. In this environment, communication is not interrupted by the handoff from the base station of the cell the mobile station is exiting to the base station of the cell the mobile unit is entering. This type of handoff can be considered a soft handoff in communications between cell base stations because two or more base stations or sectors of a single base station transmit concurrently to the mobile station during the handoff.

An improved soft handoff technique is disclosed in U.S. Pat. No. 5,267,261, entitled "MOBILE STATION ASSISTED SOFT HANDOFF IN A CDMA CELLULAR COMMUNICATIONS SYSTEM," assigned to the assignee of the present invention, the disclosure of which is incorporated by reference herein. In the improved technique of the foregoing patent, the mobile station monitors the signal strength of pilot signals transmitted by neighboring base stations within the system. When the measured signal strength exceeds a given threshold, the mobile station sends a signal strength message to a system controller via the base station through which the mobile station is communicating. Command messages from the system controller to a new base station and to the mobile station establish contemporaneous communication through the new and current base stations. When the mobile station detects that the signal strength of a pilot corresponding to at least one of the base stations through which the mobile unit is currently communicating has fallen below a predetermined level, the mobile station reports the measured signal strength indicative of the corresponding base station to the system controller via the base stations through which it is communicating. Command messages from the system controller to the identified base station and mobile station terminate communication through the corresponding base station while communications through the other base station or stations continue.

A typical cellular or personal communication system also contains some base stations within a cell having multiple sectors. A multi-sectored base station comprises multiple independent transmit and receive antennas or transceivers, each of which covers an area that is less than the total coverage area for the base station. However, the coverage areas of the individual sectors within the cell are not mutually exclusive, and typically there are areas within the cell where the sectors overlap. In general, a cell is divided into sectors to reduce the total interference power to mobile units located within the cell. The use of sectors also increases the number of mobile units that can communicate through the single base station.

The method of soft handoff between neighboring base stations described above can also be applied to a sectorized base station as disclosed in U.S. Pat. No. 5,625,876, entitled "METHOD AND APPARATUS FOR PERFORMING HANDOFF BETWEEN SECTORS OF A COMMON BASE STATION," assigned to the assignee of the present invention, the disclosure of which is incorporated by reference herein. Each sector of a common base station is treated as a separate and independent base station. Each sector of the base station combines and decodes multipath signals from a common mobile unit. The decoded data is sent directly to the cellular or personal communication system controller by each sector of the base station. Alternately, the data is compared and selected at the base station and the result is sent to the cellular or personal communication system controller. Thus, in a base station having three sectors S1, S2, and S3, soft handoff between the sectors could occur as follows:

1. The mobile unit can communicate with the base station through a sector S1 transceiver;
2. The mobile unit can detect that the pilot signal strength of the base station sector S2 transceiver exceeds a predetermined threshold value;
3. The mobile unit informs the base station controller through the base station sector S1 transceiver that the pilot signal strength of the base station sector S2 transceiver exceeds the threshold value;
4. The base station controller determines the availability of resources in station sector S2 and sends command signals to the mobile unit through the sector S1 transceiver and the sector S2 transceiver;
5. The mobile unit then begins simultaneous communications with the base station through the base station sectors S1 and S2 transceivers;
6. The base station combines the signals received from the mobile unit through its sector S1 and S2 transceivers until either one or both pilot signal strengths of the sectors falls below a predetermined threshold value and communication through the sector S1 and/or sector S2 transceivers is terminated by the base station controller.

U.S. Pat. Nos. 5,267,261 and 5,383,219, entitled "FAST FORWARD LINK POWER CONTROL IN A CODE DIVISION MULTIPLE ACCESS SYSTEM," assigned to the assignee of the present invention, the disclosure of which is incorporated by reference herein, describes a process that enables a mobile unit to update on a frame-by-frame basis the base station or stations through which it communicates by measuring the rate at which the mobile unit correctly or incorrectly decodes each forward frame.

Problems can arise, however, during soft handoff where a mobile unit communicates with more than one transceiver of a sectorized base station. In this environment, it is probable that not all base station transceivers in active communication with the mobile unit correctly decode the power control data from the mobile station. When this occurs, the gain settings of each base station transceiver in active communication with the mobile unit may not be synchronized or may even diverge. Thus, because each transceiver in a sectorized base station transmits on the same PN channel, when the gain settings of the transceivers in active communication diverge, it becomes more difficult for the mobile unit to properly combine the forward link communication signals it receives from each transceiver of the sectorized base station. Accordingly, some mechanism of keeping the forward frame gain settings of sectorized base station transceivers synchronized during handoff between sectors is needed.

SUMMARY OF THE INVENTION

The present invention enables two or more transceivers in a sectorized base station to update the power level at which each transceiver transmits to a mobile station on a forward communication link in cases where the gain settings of the two or more transceivers would otherwise diverge.

In particular, the present invention is directed to a method and apparatus for controlling the transmit power levels of first and second base station transceivers, wherein the first and second base station transceivers are respectively associated with first and second sectors of a cell. The received signal strength of a communication signal arriving at the mobile station is initially determined. A power control value that is based on the received signal strength is then transmitted from the mobile station to the first and second base station transceivers. A first received power control value is next generated by attempting to receive the transmitted power control value at the first base station transceiver, and a second received power control value is generated by attempting to receive the transmitted power control value at the second base station transceiver. A common transmit power value is calculated at the base station controller for the first and second base station transceivers when the first and second received power control values are unequal. The communication signal is then transmitted from the first and second base station transceivers in accordance with the common transmit power value.

By implementing this technique, the power levels at which transceivers in active communication with a single mobile unit are transmitting may be synchronized, thereby minimizing or eliminating the problems that may occur when a mobile station attempts to combine communication signals arriving from transceivers with divergent power levels.

BRIEF DESCRIPTION OF THE DRAWINGS

The features, objects, and advantages of the present invention will become more apparent from the detailed description set forth below in conjunction with the drawings in which like reference characters identify correspondingly throughout and wherein.

DESCRIPTION OF THE PREFERRED EMBODIMENT

Figure 1:
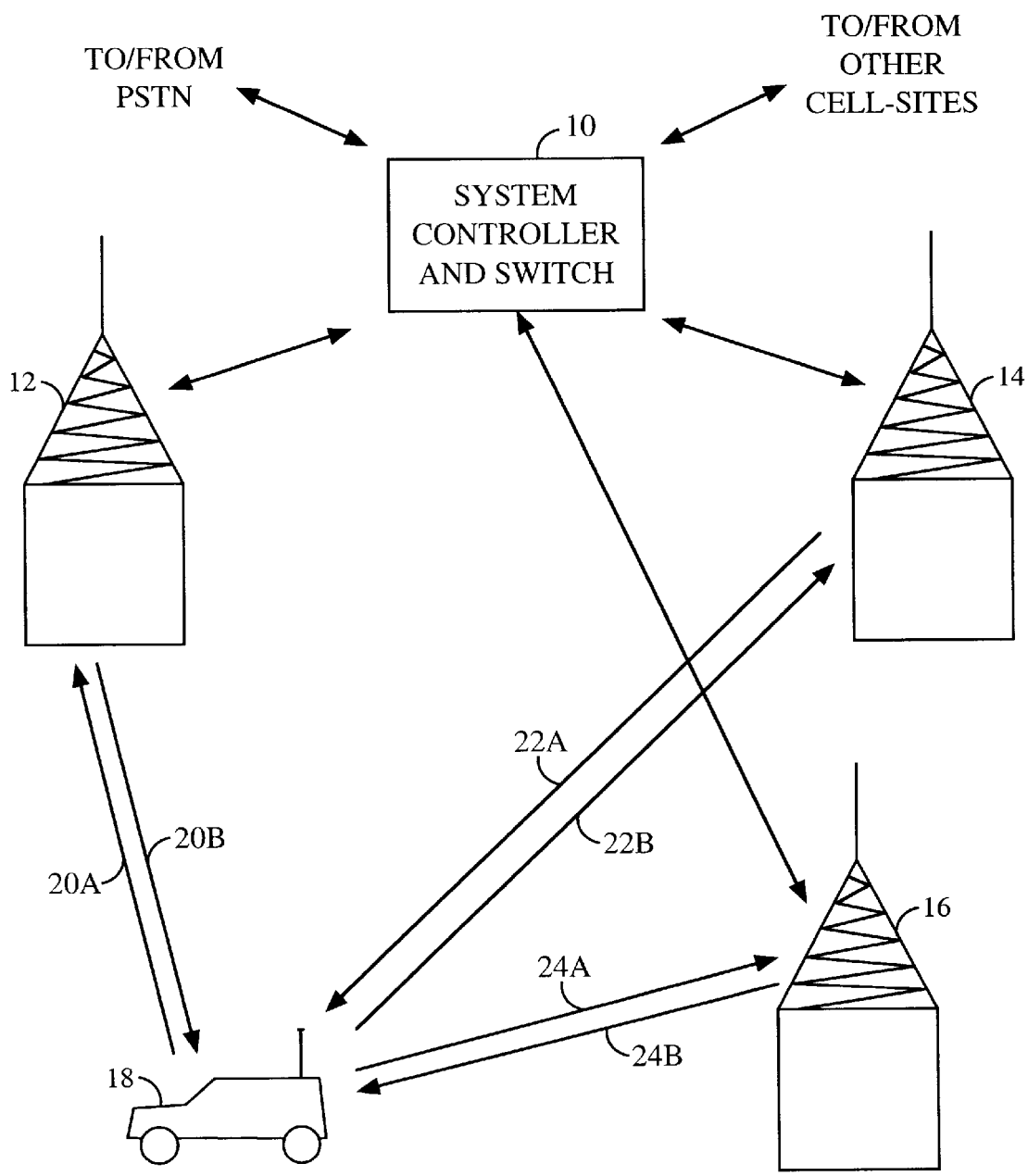
FIG. 1 shows an exemplary illustration of a cellular telephone system.

An exemplary illustration of a cellular telephone system is provided in FIG. 1. The system illustrated in FIG. 1 can utilize various multiple access modulation techniques for facilitating communications between a typically large number of mobile stations or mobile telephones, and the base stations, including CDMA spread spectrum modulation.

In the typical CDMA system, each base station transmits a unique pilot signal which comprises the transmission of a pilot carrier upon a corresponding pilot channel. The pilot signal is an unmodulated, direct sequence, spread spectrum signal transmitted at all times by each base station using a common pseudorandom noise (PN) spreading code. The pilot signal allows the mobile stations to obtain initial system synchronization. In addition to synchronization, the pilot signal provides a phase reference for coherent demodulation and a reference for signal strength measurements used in handoff determination. The pilot signal as transmitted by differing base stations can be the same PN spreading code with different code phase offsets.

FIG. 1 shows a system controller and switch 10, also referred to as a mobile switching center (MSC), that typically includes interface and processing circuitry for providing system control to the base stations. The controller 10 also controls the routing of telephone calls from the public switched telephone network (PSTN) to the appropriate base station for transmission to the appropriate mobile station. The controller 10 also controls the routing of calls from the mobile stations via at least one base station to the PSTN.

The controller 10 can be coupled to the base stations by various means such as dedicated phone lines, optical fiber links or by microwave communication links. In FIG. 1, three exemplary base stations, 12, 14, and 16 along with an exemplary mobile station 18 are illustrated. The mobile station 18, typically a cellular telephone, consists of at least a receiver, a transmitter, and a processor. The base stations 12, 14, and 16 typically include processing circuitry for controlling base station functions (base station controller or BSC), and interface circuitry for communicating with both the mobile station and the system controller. The arrows 20A–20B define the possible communication links between the base station 12 and the mobile station 18. The arrows 22A–22B define the possible communication links between the base station 14 and the mobile station 18. Similarly, the arrows 24A–24B define the possible communication links between the base station 16 and mobile station 18.The base station service areas or cells are designed in geographic shapes such that the mobile station will normally be closest to one base station.

Figure 2:
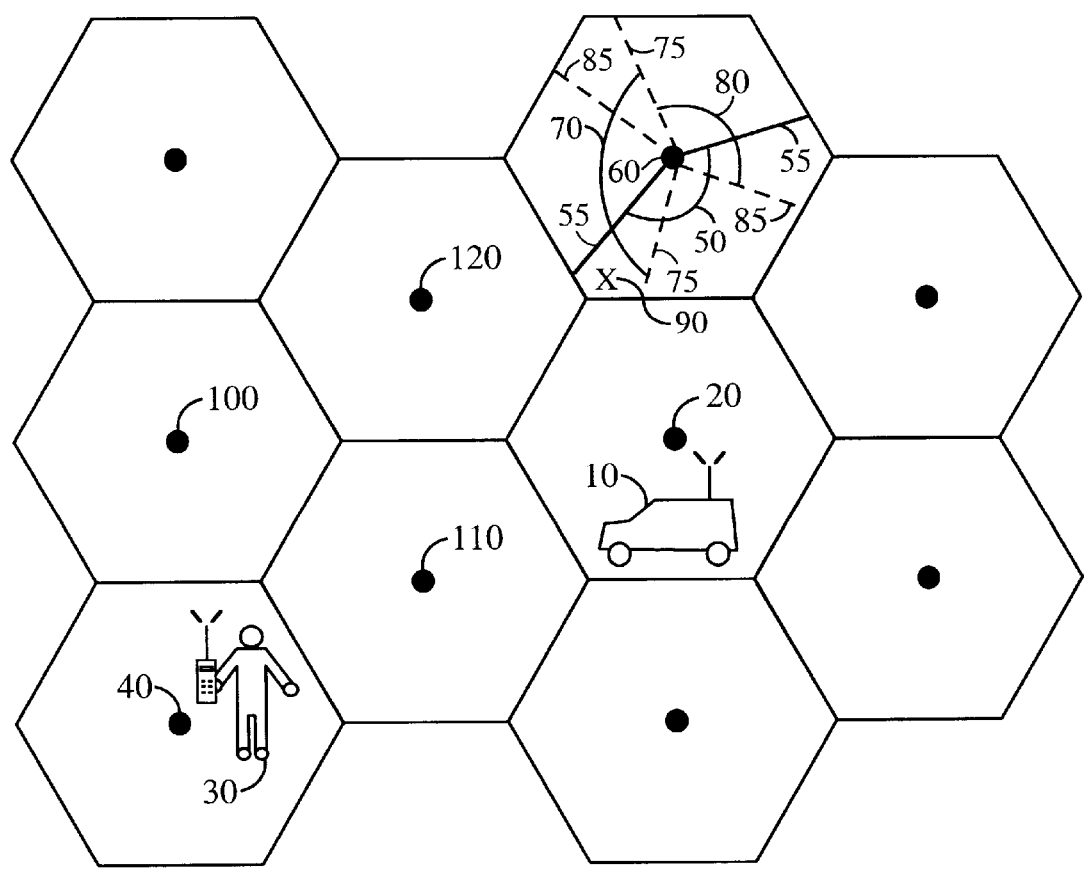
FIG. 2 shows an exemplary base station coverage area structure.

FIG. 2 shows an exemplary base station coverage area. In the exemplary coverage, hexagonal base station coverage areas abut one another in a symmetrically tiled arrangement. Each mobile station is located within the coverage area of one of the base stations. For example, the mobile station 10 is located within the coverage area of the base station 20.In a CDMA cellular or personal communication telephone system, a common frequency band is used for communication with all base stations in the system thereby allowing simultaneous communication between a mobile station and more than one base station. The mobile station 10 is located very close to the base station 20 and therefore receives a large signal from the base station 20 and relatively small signals from surrounding base stations. However, the mobile station 30 is located in the coverage area of the base station 40 but is close to the coverage area of the base stations 100 and 110. Mobile station 30 receives a relatively weak signal from base station 40 and similarly sized signals from the base stations 100 and 110. The mobile station 30 might be in soft handoff with the base stations 40, 100, and 110.

The exemplary base station coverage area structure illustrated in FIG. 2 is highly idealized. In an actual cellular or personal communication environment, base station coverage areas may vary in size and shape. Base station coverage areas may tend to overlap with coverage area boundaries defining coverage area shapes different from the ideal hexagonal shape. Furthermore, base stations may also be sectored such as into three sectors, as is well known in the art. Base station 60 is shown as a three sectored base station, however, base stations with lesser or greater numbers of sectors are envisioned.

Base station 60 of FIG. 2 represents an idealized three sector base station. The three sectors of base station 60 each cover more than 120 degrees of the base station's coverage area. Sector 50, having a coverage area indicated by the unbroken lines 55, overlaps the coverage area of sector 70, having a coverage area indicated by the coarse dashed lines 75. Sector 50 also overlaps the coverage area of sector 80, having a coverage area indicated by the fine dashed lines 85. For example, the location 90 as indicated by the X is located in both the coverage area of sector 50 and sector 70.

In general a base station is sectorized in order to reduce the total interference power to mobile stations located within the coverage area of the base station while increasing the number of mobile stations that can communicate through the base station. For example, sector 80 would not transmit a signal intended for a mobile unit at location 90. Therefore, a mobile station at location 90 would receive power from only sectors 50 and 70.

For a mobile station positioned at location 90, the total interference has contributions from sectors 50 and 70 and from bases stations 20 and 120. A mobile unit at location 90 might be in soft handoff with base stations 20 and 120. A mobile unit at location 90 might be in soft handoff with sectors 50 and 70 as well.

Figure 3:
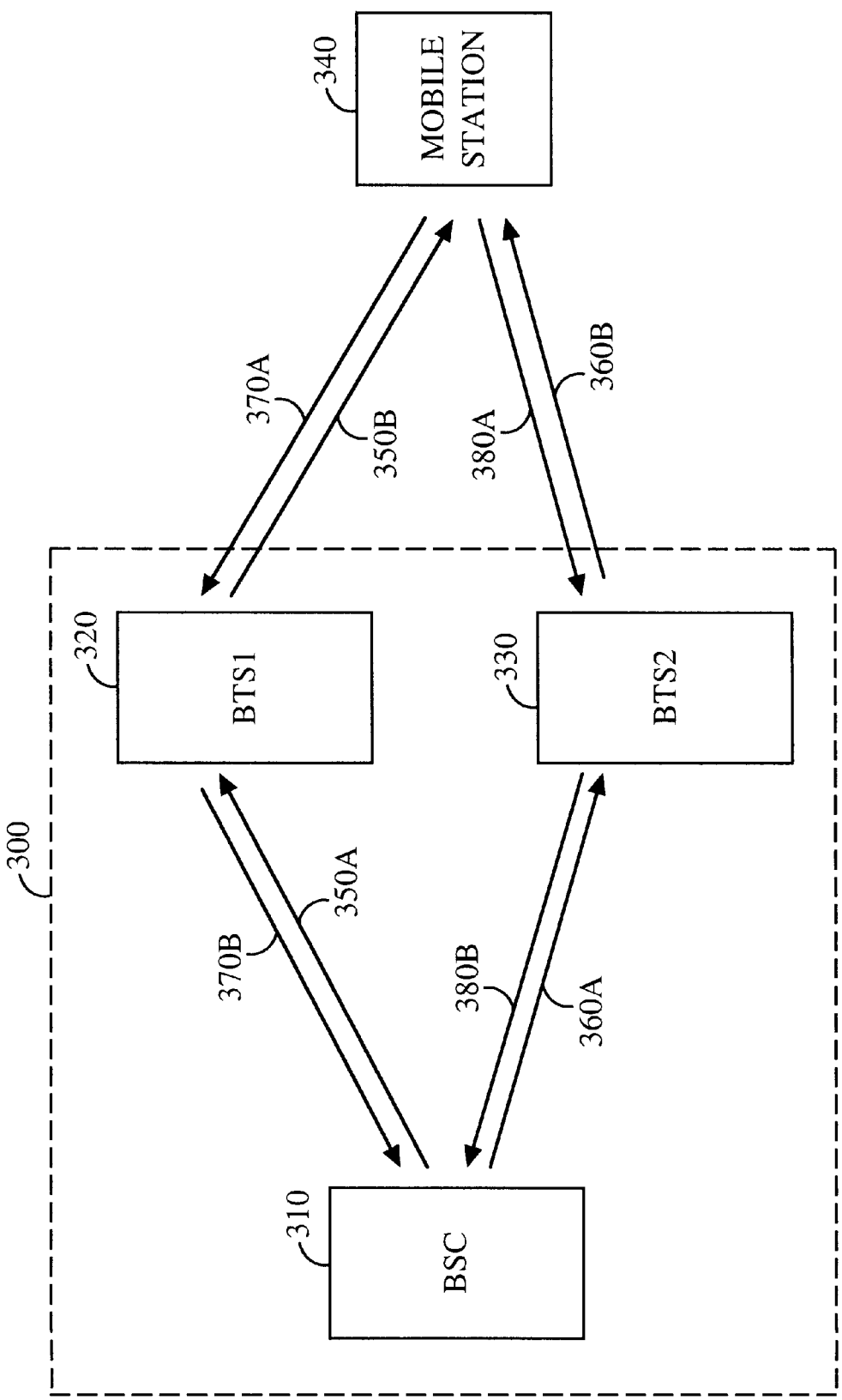
FIG. 3 shows the forward and reverse communication links between a mobile station and an exemplary two sector base station.

Referring now to FIG. 3, the forward and reverse communication links between a mobile station and an exemplary two sector base station are illustrated. Base station 300 is comprised of a base station controller 310 (BSC), base station transceiver 320 (BTS1), and base station transceiver 330 (BTS2). Each base station transceiver 320, 330 provides service to one sector in the coverage area of the two sector base station. Arrows 350*a* and 360*a* represent the forward communication links between base station controller 310 and base station transceivers 320 and 330 respectively. Likewise, arrows 350*b* and 360*b* represent the possible forward communication links between base station 300 and mobile station 340. Arrows 370*a* and 380*a* represent the possible reverse communication links between mobile station 340 and base station 300. Arrows 370*b* and 380*b* represent the reverse communication links base station transceivers 320 and 330 respectively and base station controller 310.

Whether at a sectorized or non-sectorized base station, a set of multipath signals from a single mobile unit are separately demodulated and then combined before the decoding process. Therefore, the decoded data output from each base station is based on all of the advantageous signal paths available from the mobile unit. The decoded data is then sent to the cellular or personal communication system controller from each base station in the system. Thus, for each mobile station operating in soft handoff in the system, the cellular or personal communication system controller receives decoded data from at least two base stations.

In accordance with the present invention, CDMA communications can occur on both the forward and reverse links at a number of data rates which are grouped into six rate sets based on a number of criteria. The six rate sets are then further divided into three groups: rate sets 1 and 2, rate sets 3 and 4, and rate sets 5 and 6. The rate set 3 and 5 blocks contain the same number of information bits as the rate set 1 blocks. The rate set 4 and 6 blocks contain the same number of information bits as the rate set 2 blocks. Different rate sets may be used on the forward and reverse links, provided the rate sets come from the same group. Rate sets 1 and 2 correspond to the rate sets 1 and 2 described in the TIA/EIA Interim Standards entitled "Mobile Station—Base Station Compatibility Standard for Dual-Mode Wideband Spread Spectrum Cellular System," TIA/EIA/IS-95A and TIA/EIA/IS-95B, (hereinafter, IS-95A and IS-95B), the contents of which are incorporated herein by reference. The details of the forward link encoder numerology for rate set 3, 4, 5, and 6 are set forth in Tables 1–4 below:

TABLE 1

Forward Link Encoder Numerology for Rate Set 3

| Item | | | Value | | | | | | |
|---|---|---|---|---|---|---|---|---|---|
| Rate | Units | Label | 1/8 | | 1/4 | | 1/2 | | 1 |
| Info | Bits/Block | A | 0 | 0 | 0 | 0 | 8 | 8 | 172 |
| CRC | Bits/Blocks | B | 0 | 0 | 0 | 0 | 8 | 8 | 12 |
| Tail | Bits/Block | C | 8 | 8 | 8 | 8 | 8 | 8 | 8 |
| Bits | Bits/Block | C | 24 | 24 | 48 | 48 | 96 | 96 | 192 |

TABLE 1-continued

Forward Link Encoder Numerology for Rate Set 3

| Item | | | Value | | | | | | |
|---|---|---|---|---|---|---|---|---|---|
| Rate | Units | Label | 1/8 | | 1/4 | | 1/2 | | 1 |
| Encoder Rate | Bits/Block | D | 1/4 | 1/4 | 1/4 | 1/4 | 1/4 | 1/4 | 1/4 |
| Repeat Rate | Symbols/Symbol | E | 8 | 8 | 4 | 4 | 2 | 2 | 1 |
| Puncture Rate | Symbols/Symbol | G | 0 | 0 | 0 | 0 | 0 | 0 | 0 |
| Symbols | Symbols/Symbol | G | 768 | 768 | 768 | 768 | 768 | 768 | 768 |
| Gating Factor | Symbols/Symbol | J | 1/2 | 1 | 1/2 | 1 | 1/2 | 1 | 1 |
| Symbols | Symbols/block | J | 384 | 768 | 384 | 768 | 384 | 768 | 768 |

TABLE 2

Forward Link Encoder Numerology for Rate Set 4

| Item | | | Value | | | | | | |
|---|---|---|---|---|---|---|---|---|---|
| Rate | Units | Label | 1/8 | | 1/4 | | 1/2 | | 1 |
| Info | Bits/Block | A | 22 | 22 | 56 | 56 | 126 | 126 | 268 |
| CRC | Bits/Blocks | B | 6 | 6 | 8 | 8 | 10 | 10 | 12 |
| Tail | Bits/Block | C | 8 | 8 | 8 | 8 | 8 | 8 | 8 |
| Bits | Bits/Block | C | 36 | 36 | 72 | 72 | 144 | 144 | 288 |
| Encoder Rate | Bits/Block | D | 1/4 | 1/4 | 1/4 | 1/4 | 1/4 | 1/4 | 1/4 |
| Repeat Rate | Symbols/Symbol | E | 8 | 8 | 4 | 4 | 2 | 2 | 1 |
| Puncture Rate | Symbols/Symbol | G | 1/3 | 1/3 | 1/3 | 1/3 | 1/3 | 1/3 | 1/3 |
| Symbols | Symbols/Symbol | G | 768 | 768 | 768 | 768 | 768 | 768 | 768 |
| Gating Factor | Symbols/Symbol | J | 1/2 | 1 | 1/2 | 1 | 1/2 | 1 | 1 |
| Symbols | Symbols/block | J | 384 | 768 | 384 | 768 | 384 | 768 | 768 |

TABLE 3

Forward Link Encoder Numerology for Rate Set 5

| Item | | | Value | | | | | | |
|---|---|---|---|---|---|---|---|---|---|
| Rate | Units | Label | 1/8 | | 1/4 | | 1/2 | | 1 |
| Info | Bits/Block | A | 16 | 16 | 40 | 40 | 80 | 80 | 172 |
| CRC | Bits/Blocks | B | 0 | 0 | 0 | 0 | 8 | 8 | 12 |

TABLE 3-continued

Forward Link Encoder Numerology for Rate Set 5

| Item | | | Value | | | | | | |
|---|---|---|---|---|---|---|---|---|---|
| Rate | Units | Label | 1/8 | | 1/4 | | 1/2 | | 1 |
| Tail | Bits/Block | C | 8 | 8 | 8 | 8 | 8 | 8 | 8 |
| Bits | Bits/Block | C | 24 | 24 | 48 | 48 | 96 | 96 | 192 |
| Encoder Rate | Bits/Block | D | 1/2 | 1/2 | 1/2 | 1/2 | 1/2 | 1/2 | 1/2 |
| Repeat Rate | Symbols/Symbol | E | 8 | 8 | 4 | 4 | 2 | 2 | 1 |
| Puncture Rate | Symbols/Symbol | G | 0 | 0 | 0 | 0 | 0 | 0 | 0 |
| Symbols | Symbols/Symbol | G | 384 | 384 | 384 | 384 | 384 | 384 | 384 |
| Gating Factor | Symbols/Symbol | J | 1/2 | 1 | 1/2 | 1 | 1/2 | 1 | 1 |
| Symbols | Symbols/block | J | 192 | 384 | 192 | 384 | 192 | 384 | 384 |

TABLE 4

Forward Link Encoder Numerology for Rate Set 6

| Item | | | Value | | | | | | |
|---|---|---|---|---|---|---|---|---|---|
| Rate | Units | Label | 1/8 | | 1/4 | | 1/2 | | 1 |
| Info | Bits/Block | A | 22 | 22 | 56 | 56 | 126 | 126 | 268 |
| CRC | Bits/Blocks | B | 6 | 6 | 8 | 8 | 10 | 10 | 12 |
| Tail | Bits/Block | C | 8 | 8 | 8 | 8 | 8 | 8 | 8 |
| Bits | Bits/Block | C | 36 | 36 | 72 | 72 | 144 | 144 | 288 |
| Encoder Rate | Bits/Block | D | 1/2 | 1/2 | 1/2 | 1/2 | 1/2 | 1/2 | 1/2 |
| Repeat Rate | Symbols/Symbol | E | 8 | 8 | 4 | 4 | 2 | 2 | 1 |
| Puncture Rate | Symbols/Symbol | G | 1/3 | 1/3 | 1/3 | 1/3 | 1/3 | 1/3 | 1/3 |
| Symbols | Symbols/Symbol | G | 384 | 384 | 384 | 384 | 384 | 384 | 384 |
| Gating Factor | Symbols/Symbol | J | 1/2 | 1 | 1/2 | 1 | 1/2 | 1 | 1 |
| Symbols | Symbols/block | J | 192 | 384 | 192 | 384 | 192 | 384 | 384 |

Figure 4:
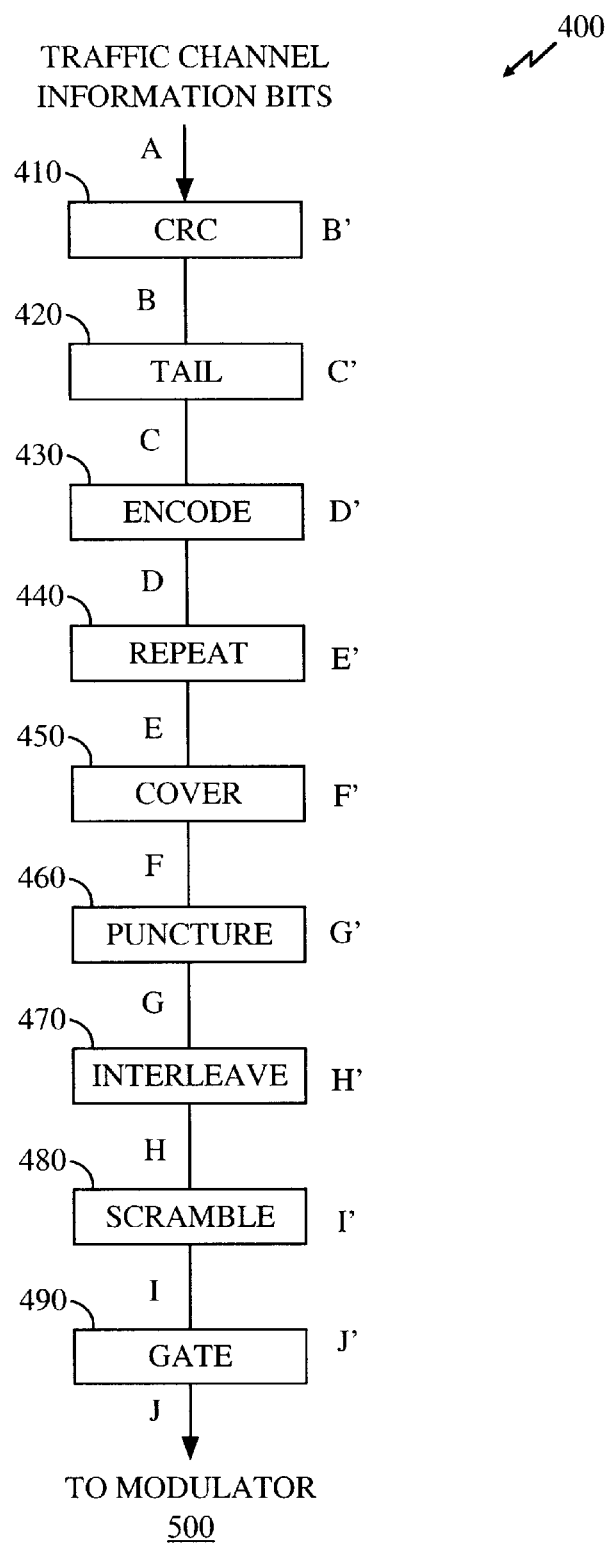
FIG. 4 shows an encoder for encoding the forward link traffic channel information transmitted by a base station transceiver, in accordance with the present invention.

Referring now to FIG. 4, there is shown a block diagram of an encoder 400 for encoding forward link traffic channel information bits transmitted by a base station transceiver, in accordance with the present invention. Encoder 400 receives as its input blocks of traffic channel information bits to be transmitted from a base station transceiver to a mobile station on a forward link. By way of an overview, encoder 500 appends cyclic redundancy check (CRC) bits to the information bits, appends tail bits to block code, encodes with a convolutional encoder, repeats to increase the symbol rate to at least the full rate symbol rate, Walsh covers to make the rates orthogonal, punctures to reduce the symbol to a number that can be carried on one or two forward code channels, interleaves with a bit reversal block interleaver, scrambles the symbols, and optionally gates off 50 percent of the symbols.

CRC block 410 appends CRC bits to the input information blocks as follows. The rate set 1, 3 and 5 input blocks have 8-bit and 12-bit CRCs on the rate ½ and rate 1 blocks, respectively. The rate set 2, 4 and 6 blocks have 6-bit, 8-bit, 10-bit and 12-bit CRCs on the rate ⅛, rate ¼, rate ½ and rate 1 blocks respectively. The polynomials used for generating the CRC bits are shown in Table 5 below. Initially, the CRC generators used are loaded with all 1's.

TABLE 5

Forward Link CRC Generators

| Rate | Generator (octal) Rate Set 1, 3, and 5 | Polynomial Rate Set 2, 4 and 6 |
|---|---|---|
| 1/8 | | 0107 |
| 1/4 | | 0633 |
| 1/2 | 0633 | 03731 |
| 1 | 017423 | 017423 |

After the CRC bits are added to the input information blocks and tail bits are appended by tail bit coder 420 to block code, the output of tail bit coder 420 is alternatively provided to one of two convolutional encoders 430 depending on the rate set being used. The rate 1, 2, 5 and 6 convolutional encoder is a constraint length 9, rate ½ convolutional encoder. The rate set 3 and 4 convolutional encoder is a constraint length 9, rate ¼, convolutional encoder. The generator functions for both encoders 430 are shown in Table 6 below, and the minimum free distances for the encoders are shown in Table 7 below.

TABLE 6

| Symbol | Generator (octal) Rate Set 1, 2, 5 and 6 | Function Rate Set 3 and 4 |
|---|---|---|
| 0 | 0753 | 0765 |
| 1 | 0561 | 0671 |
| 2 | | 0513 |
| 3 | | 0473 |

TABLE 7

| Rate Set 1, 2, 5 and 6 | Rate Set 3 and 4 |
|---|---|
| 12 | 24 |

Forward Link Convolutional Encoder Minimum Free Distance

Each encoder 430 is blocked on a per-block basis by initializing the encoder state with zero and tailing every block with an 8-bit all zero encoder tail.

The output of encoder 430 is provided to symbol repetition unit 440, which repeats the symbols 8, 4, 2 and 1 times for the rate ⅛, rate ¼, rate ½ and rate 1 blocks, respectively.

After the symbols are repeated, they are provided to covering unit 450, where the rate set 3, 4, 5 and 6 symbols are covered with a rate dependent Walsh code running at the symbol rate. The rate dependent Walsh codes are shown in Table 8 below, where $W_x^n$ represents the Walsh code x of an n-ary Walsh code space. The Walsh codes chosen are from an 8-ary Walsh code space. The codes are chosen for two reasons. First, the assignments are chosen so that rates less than rate 1 are mutually orthogonal. There is some loss of orthogonality due to the puncturing that follows. However, puncturing before symbol repetition in order to maintain orthogonality degrades the convolutional encoder/decoder performance. Therefore, some orthogonality is sacrificed. Second, the assignments are chosen so that the rate 1 code is mutually orthogonal to all other rates when the rate I frame contains a run of 0's or 1's. As a result of the Walsh code covering, the decoder will be less likely to mistake a higher rate block with runs of 0's or 1's for a lower rate block with runs of 0's or 1's. This can be important during data transmissions, since runs of 0's or 1's occur disproportionately often during the transmission of uncompressed and unencrypted data. In addition, the decoder will be much less likely to decode a less than rate 1 block as another less than rate 1 block.

TABLE 8

Forward Link Rate Dependent Walsh Covers for Rate Sets 3, 4, 5 and 6

| | Walsh Code | |
| --- | --- | --- |
| Rate | Label | Pattern |
| 1 | $W_0^1$ | + |
| 1/2 | $W_1^2$ | +− |
| 1/4 | $W_2^4$ | ++−− |
| 1/8 | $W_4^8$ | ++++−−−− |

For rate sets 2, 4 and 6, the block has 50 percent more symbols than the rate set 1, 3 and 5 blocks respectively. In order to reduce the number of symbols so that a rate set 2, 4 or 6 block can be transmitted using the same number of forward code channels as a rate set 1, 3 or 5 block, the symbol stream must be punctured. Thus, the output of covering unit 450 is provided to puncturing unit 460. The puncture patterns used by puncture unit 460 are shown in Table 9, where a 1 means transmit the symbol and a 0 means puncture the symbol.

TABLE 9

Forward Link Puncture Patterns

| | Puncture (binary) | | Pattern |
| --- | --- | --- | --- |
| Rate | Rate Set 1, 3 and 5 | Rate Set 2 and 6 | Rate Set 4 |
| 1/8 | | 110101 | 110110011011 |
| 1/4 | | 110101 | 110110011011 |
| 1/2 | | 110101 | 110110011011 |
| 1 | | 110101 | 110110011011 |

The output of puncture unit 460 is alternatively provided to one of two interleavers 470 depending on the rate set being used. The rate set 1, 2, 5 and 6 interleaver is a bit reversal block interleaver with 64 rows and 6 columns. The interleaver is written column first, using a column counter in order. The interleaver is read row first, using a row counter in bit reversed order. That is, if the row counter indicates $b_5b_4b_3b_2b_1b_0$, then the row $b_0b_{12}b_3b_4b_5$ is read. The rate set 3 and 4 interleaver is a bit reversal block interleaver with 128 rows and 6 columns. These interleavers have two useful properties. First, they create a pseudo-random temporal separation between adjacent code symbols. This makes them more robust over a variety of channel conditions. Second, for less than rate 1 blocks, the bit reversal interleaver results in evenly spaced copies of the repeated symbols. This is useful during frame gating, because it ensures that the gating will destroy exactly half the repeated symbols and preserve the orthogonality properties of the symbol Walsh covering.

The output of interleaver 470 is provided to a scrambling unit 480, which scrambles the symbol stream in the same manner recited in the IS-95-A standard, incorporated herein by reference.

The output of scrambling unit 480 is provided to a gating unit 490. In the present invention, gating is supported for rate sets 3, 4, 5 and 6. When a block is gated, only the symbols within the second half of the block are transmitted. For rate sets 3 and 4, this means that symbols 384 through 767 are transmitted. For rate sets 5 and 6, this means that symbols 192 through 383 are transmitted. During gating, the maximum frame rate is rate ½.

Normally, the traffic information frames are transmitted on the forward link using continuous transmission. However, rate sets 3, 4, 5 and 6 may be commanded into a mode where only rate ⅛, rate ¼ and rate ½ frames are transmitted, and they are transmitted using gated transmission. This mode is used to allow the mobile station time to retune its receiver and search for systems using other frequencies and/or other technologies (in particular AMPS and GSM). A mobile station commanded into gated mode for searching will be commanded to gate N frames out of M frames, starting at system time T. The values of N and M depend on the technology being searched and the number of channels being searched.

Figure 5:
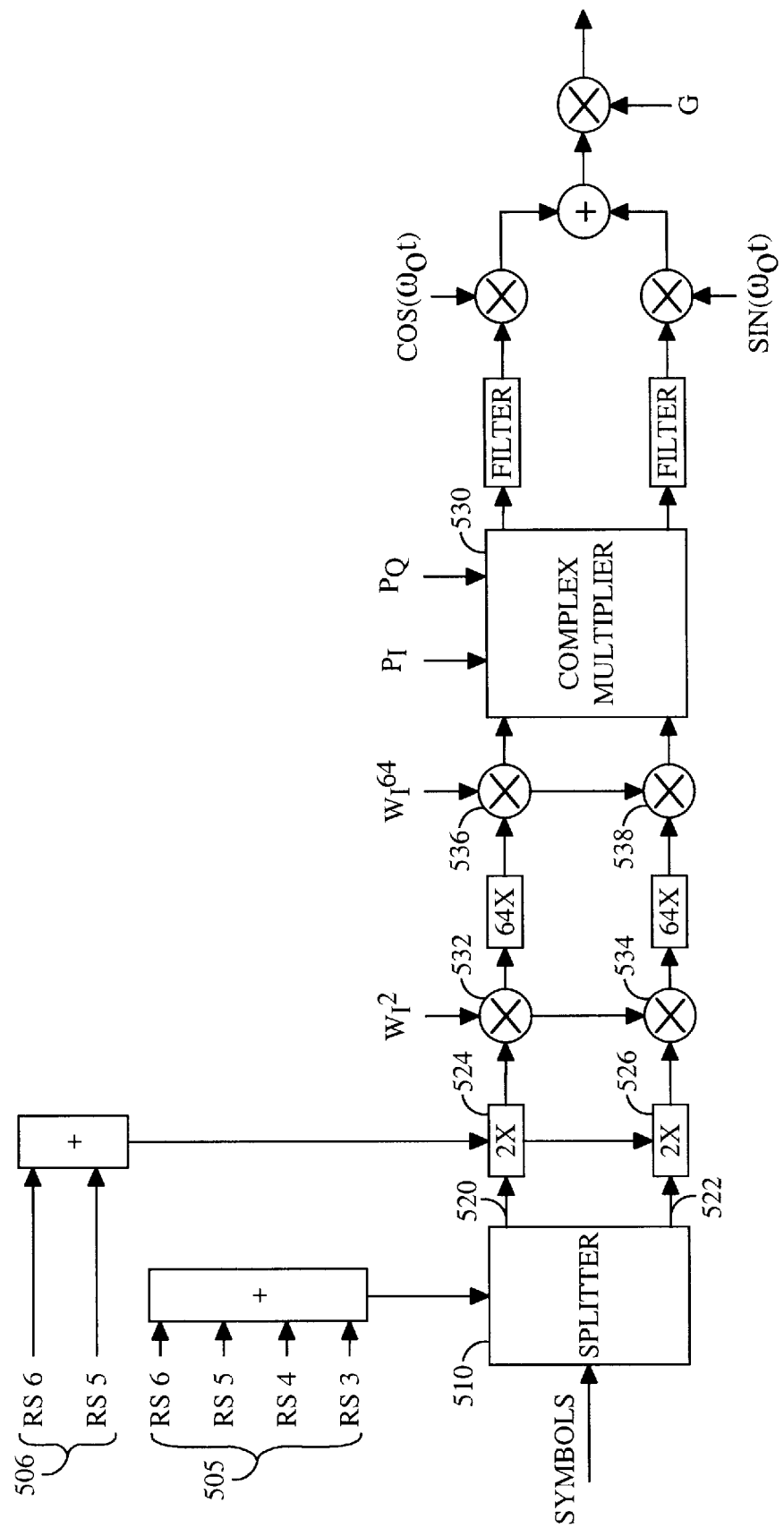
FIG. 5 shows a modulator that modulates and gain adjusts the encoded forward link traffic information transmitted by a base station transceiver, in accordance with the present invention.

Referring now to FIG. 5, there is shown a modulator 500 that modulates and gain adjusts the encoded forward link traffic information output by encoder 400, in accordance with the present invention. The numerology for modulator 500 is shown in Table 10 below. This table shows the number of forward link code channels (128-ary Walsh codes) needed to transmit each rate set.

TABLE 10

Forward Link Modulator Numerology

| | | Value | | |
| --- | --- | --- | --- | --- |
| Item | Units | Rate Set 1 and 2 | Rate Set 3 and 4 | Rate Set 5 and 6 |
| Chips | chips/frame | 24576 | 24576 | 24576 |
| Modulation Symbols | symbols/frame | 384 | 768 | 384 |
| Chip Rate | chips/symbol | 64 | 64 | 128 |
| Code Channels | 128-ary Walsh | 2 | 2 | 1 |

For rate sets 3, 4, 5 and 6, modulator 500 transmits a QPSK waveform, alternating the transmission of code symbols between the in-phase and quadrature-phase. This reduces the per phase symbol rate by a factor or two, doubling the number of forward code channels.

For rate sets 1, 2, 3 and 4, 2 128-ary Walsh codes are used. When a link is assigned code channel x (with x between 0 and 63), it uses Walsh code $W_x^{64}=\{W_x^{128}, W_{x+64}^{128}\}$ For rate sets 5 and 6, 1 128-ary Walsh code is used. When a link is assigned code channel x with (x between 0 and 127), it uses Walsh code $W_x^{128}$.

Table 11 shows how to interpret the IS-95 CODE-CHAN field with the addition of the 64 Walsh codes, when used in accordance with the present invention. Bit 6 will not be a 1 if rate set 1, rate set 2, rate set 3 or rate set 4 is used.

TABLE 11

CODE-CHAN Field Interpretation

| Subfield | Reserved | Walsh Code |
|---|---|---|
| Bit | 0 | 6 \| 5 \| 4 \| 3 \| 2 \| 1 \| 0 |

Referring again to FIG. 5, when enabled via control signals 505, the symbol splitter (labeled Splitter 510) in modulator 500 alternates input symbols between the upper and lower outputs 520, 522, starting with the first symbol being sent to the upper output. When disabled, the splitter 510 sends all input symbols to the upper output 520 and sends 0 to the lower output 522. When enabled via control signals 506, the symbol repeaters 524, 526 (labeled "2×" and "64×") repeat the symbols the number of times indicated by the label. When disabled, the symbol repeaters 524, 526 do not repeat the symbols. The complex multiplier 530 (labeled "Complex Multiplier") computes its outputs in accordance with equations (1) and (2) below:

$$\text{Output}_i = P_i \cdot \text{Input}_i - P_q \cdot \text{Input}_q \quad (1)$$

$$\text{Output}_q = P_q \cdot \text{Input}_i + P_i \cdot \text{Input}_q \quad (2)$$

The Walsh code $W_j^2$ provided to mixers 532, 534 corresponds to bit 6 of the CODE_CHAN field described above, and the Walsh code $W_i^{64}$ provided to mixers 536, 538 corresponds to bits 5 through 0 of the CODE_CHAN field described above.

In the present invention, base stations transmit power control information (i.e., power-up, power-down and power-hold commands discussed more fully below) to mobile stations on a forward link power control subchannel. The forward link power control subchannel is punctured into the fundamental block of the forward traffic channel. In a particularly preferred embodiment, every 1.25 milliseconds, one or two PN-words (a PN-word is 63 PN chips) of the fundamental block is punctured. The alignment and duration of the puncturing is chosen such that it punctures one or more complete modulation symbols. As explained more fully below, in order to determine the information to be transmitted on the forward link power control subchannel, a base station measures the strength of a reverse traffic channel signal received from a mobile station, and then converts the measurement into a power control bit.

Figure 6:
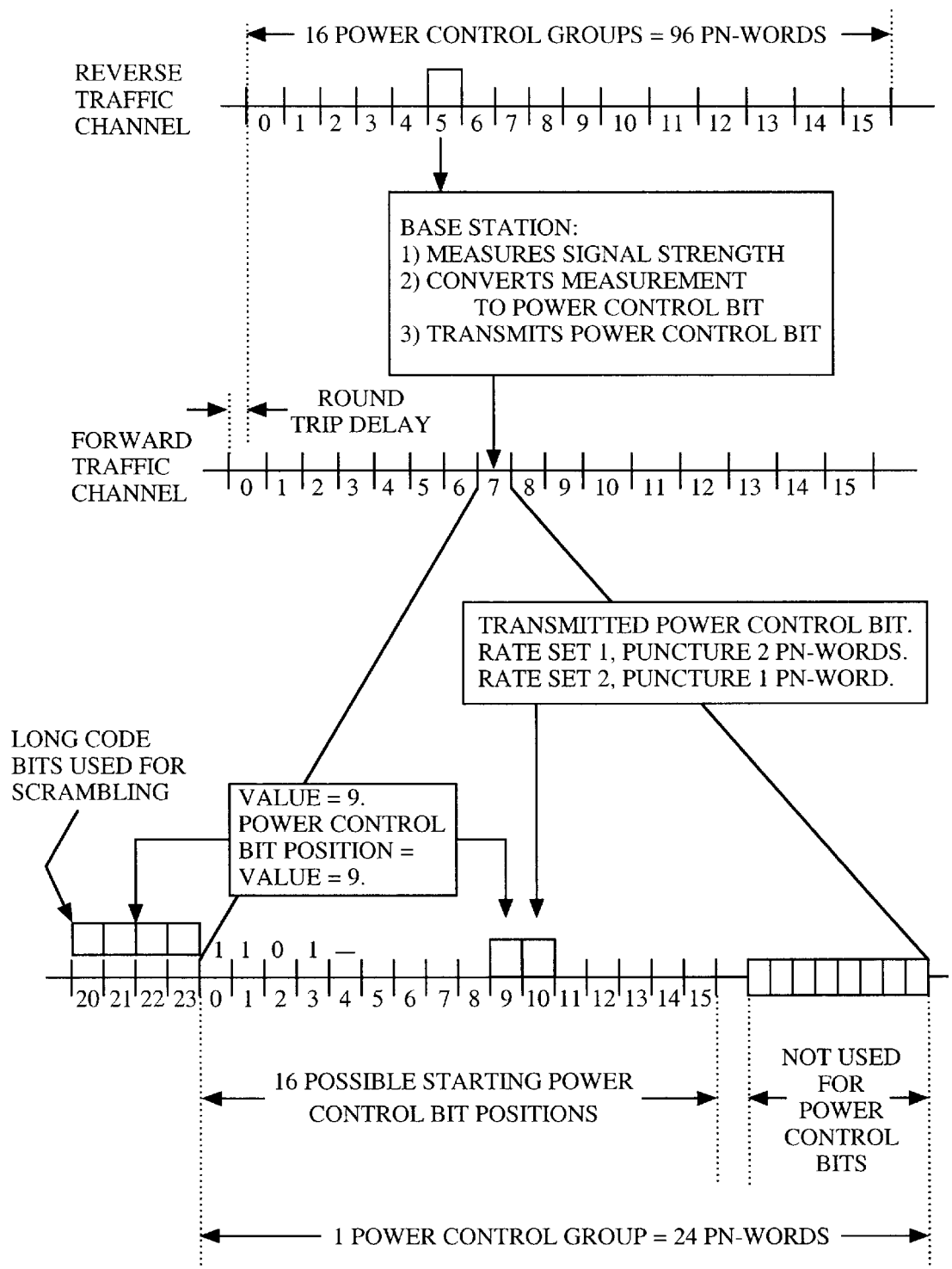
FIG. 6 is a diagram showing the timing of a forward link power control subchannel implemented using first and second rate sets, in accordance with the present invention.

FIG. 6 shows the timing for the rate set 1 and 2 power control subchannels. Each block is divided into 16 power control groups. Each power control group is divided into 24 PN-words. The PN-words align to the BPSK modulation symbols of traffic channel. The rate set 1 and 2 power control subchannel randomizes the start of the power control command over 16 PN-words, starting at PN-word 0 of power control group n+2. The starting position of the power control command in the fundamental block stream is determined by bits 23, 22, 21 and 20 ($b_{23}, b_{22}, b_{21}$ and $b_{20}$) of the previous power control group's (power control group n+1) scrambling sequence. The starting position of the power control group is PN-word $(b_{23}b_{22}b_{21}b_{20})_{24}$ of power control group n+2.

Once the starting position of the power control command is determined, a BPSK symbol representing the power control command is inserted in place of the punctured symbols. A '±1' represents an up command (i.e., a command indicating that the mobile station should increase its transmit power by a predetermined amount.) A '−1' represents a down command (i.e., a command indicating that the mobile station should decrease its transmit power by a predetermined amount.) For rate set 1, the BPSK symbol is 2 PN-words in duration. For rate set 2, the BPSK symbol is 1 PN-word in duration.

Figure 7:
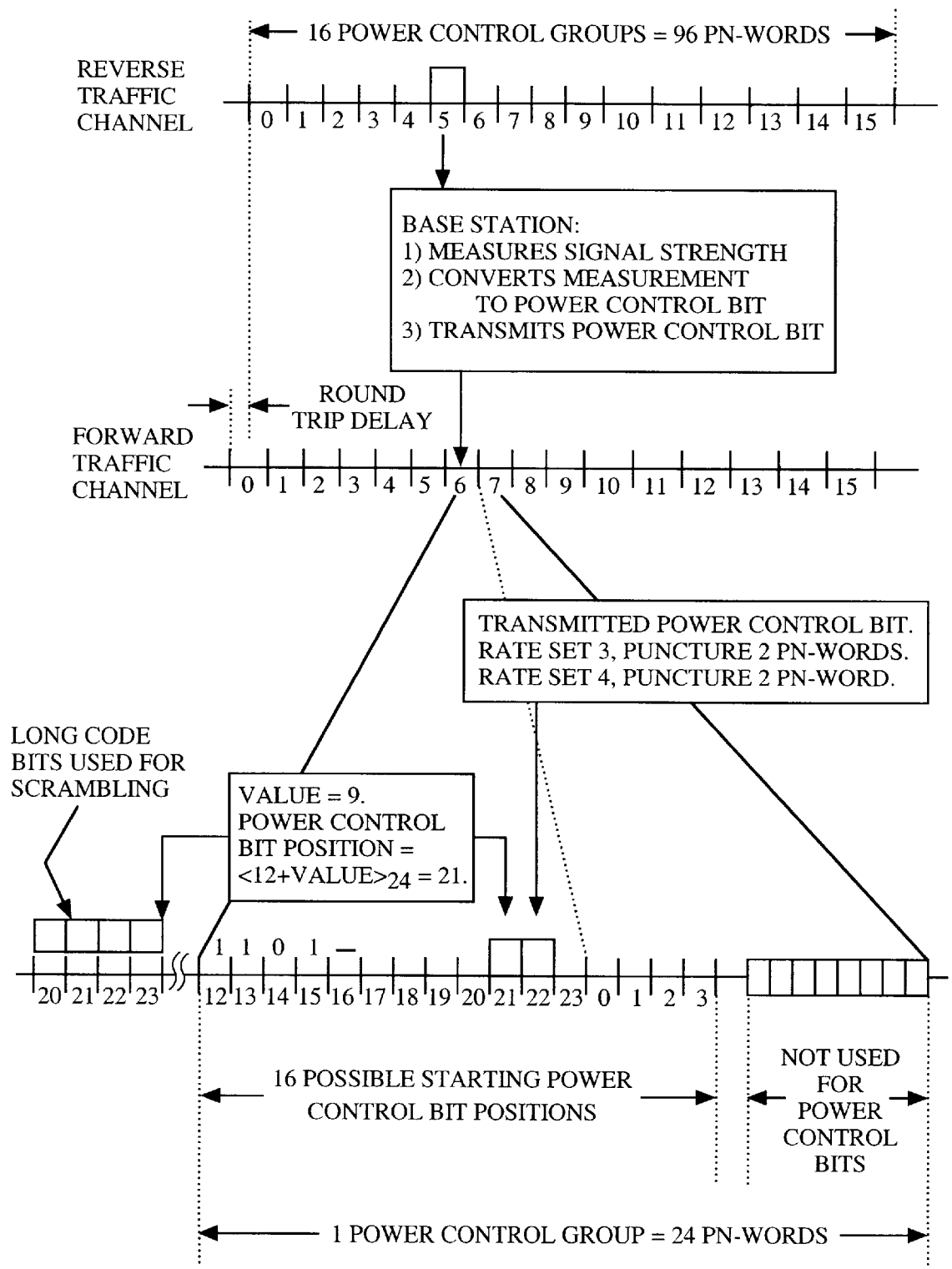
FIG. 7 is a diagram showing the timing of a forward link power control subchannel implemented using third and fourth rate sets, in accordance with the present invention.

FIG. 7 shows the timing for the rate set 3 and 4 power control subchannels. The timing for the rate set 3 and 4 power control subchannels is similar to the timing for the rate set 1 and 2 power control subchannels, with the exception that the timing is advanced by 12 PN-words. This is done in order to reduce the delay of the power control loop. Thus, assuming the receive signal strength is measured during power control group n, the power control command is started in the last ½ of power control group n+1 rather than the first ½ of power control group n+2. This timing reduces the average delay in sending the power control command from 1 ⅓ power control groups to ⅚ of a power control group. In addition, reducing the time it takes the mobile station to make the power control adjustment from ½ of a power control group to ⅙ of a power control group, reduces the power control group delay from an average of 1⅚ power control groups to 1⅙ power control groups.

As shown in FIG. 7, each block on the forward traffic channel is divided into 16 power control groups. Each power control group is divided into 24 PN-words. Again, the PN-words align to the QPSK modulation symbols of the traffic channel. The rate set 3 and 4 power control subchannel randomizes the start of the power control command over 16 PN-words, starting at PN-word 16 of power control group n+1. The starting position of the power control command in the traffic channel stream is determined by bits 23, 22, 21 and 20 ($b_{23}, b_{22}, b_{21}$ and $b_{20}$) of the previous power control group's (power control group n) scrambling sequence. The starting position of the power control command is PN-word $(12+b_{23}b_{22}b_{21}b_{20})24$ of power control group n+1+[<12+$b_{23}b_{22}b_{21}b_{20}$>/24].

Referring still to FIG. 7, once the starting position of the power control command is determined for rate sets 3 and 4, a QPSK symbol representing the power control command is inserted in place of the punctured symbols. A '(+1,+1)' represents an up command, and a '(−1,−1)' represents a down command. For rate sets 3 and 4, the QPSK symbol is 2 PN-words in duration.

Figure 8:
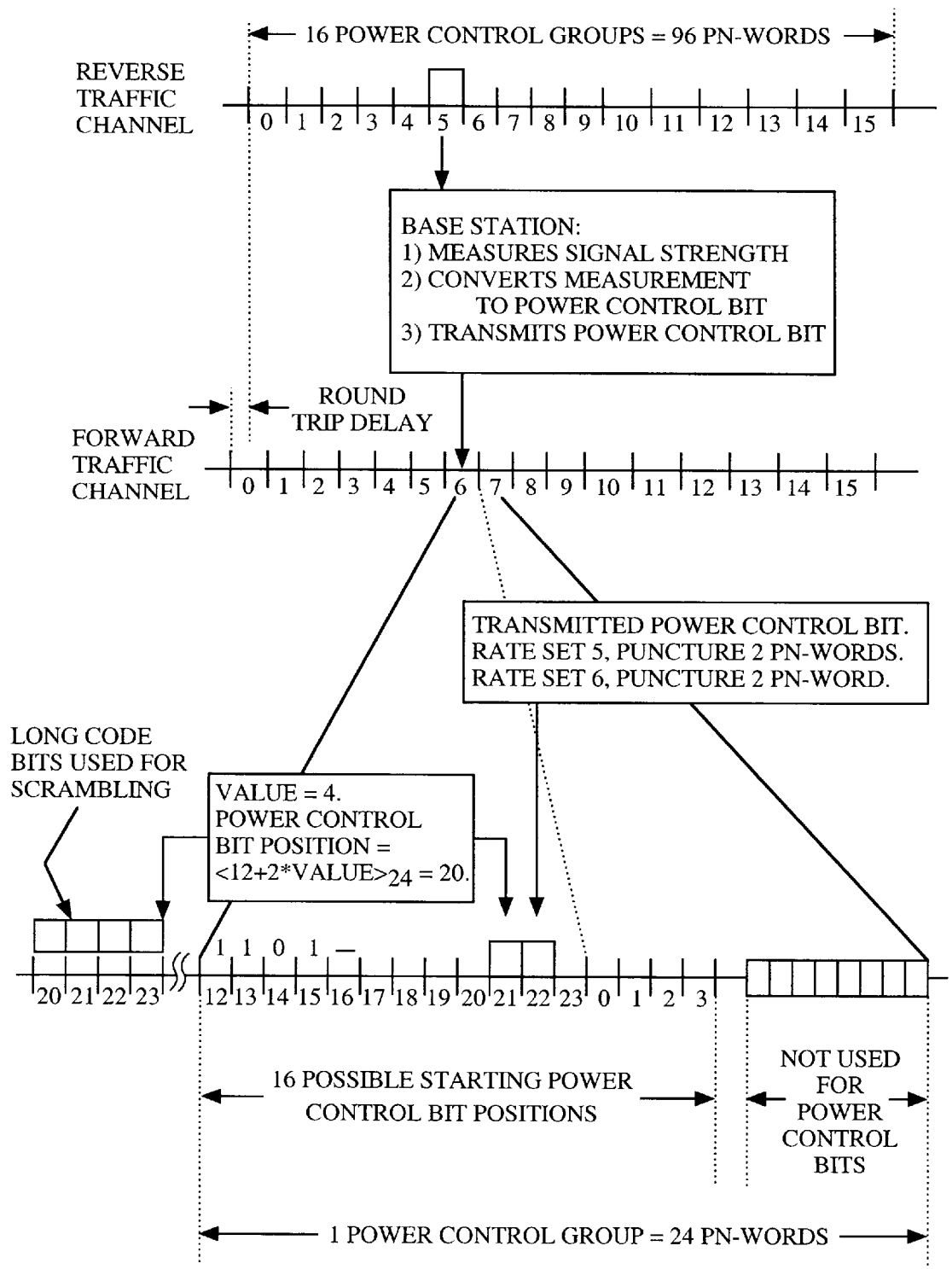
FIG. 8 is a diagram showing the timing of a forward link power control subchannel implemented using fifth and sixth rate sets, in accordance with the present invention.

FIG. 8 shows the timing for the rate set 5 and 6 power control subchannels. The timing for the rate set 5 and 6 power control subchannels is similar to the timing for the rate set 3 and 4 power control subchannels, with the exception that puncturing is aligned to even PN-words and is an even number of PN-words in duration. This is done because the traffic channel modulation symbols are 2 PN-words (128 PN chips) in duration.

As shown in FIG. 8, each block on the forward traffic channel is divided into 16 power control groups, and each power control group is divided into 24 PN-words. The rate set 5 and 6 power control subchannel randomizes the start of the power control command over 16 PN-words, starting at PN-word 16 of power control group n+1. The starting position of the power control command in the traffic channel stream is determined by bits 23, 22 and 21 ($b_{23}, b_{22}$, and $b_{21}$) of the previous power control group's (power control group n) scrambling sequence. The starting position of the power control command is PN-word $<12+b_{23}b_{22}b_{21}>_{24}$ of power control group n+1+[<12+$b_{23}b_{22}b_{21}$>/$_{24}$].

Referring still to FIG. 8, once the starting position of the power control command is determined for rate sets 5 and 6, a QPSK symbol representing the power control command is inserted in place of the punctured symbols. A '(+1,+1)' represents an up command. A '(−1,−1)' represents a down command. For rate sets 5 and 6, the QPSK symbol is 2 PN-words in duration.

Figure 9:
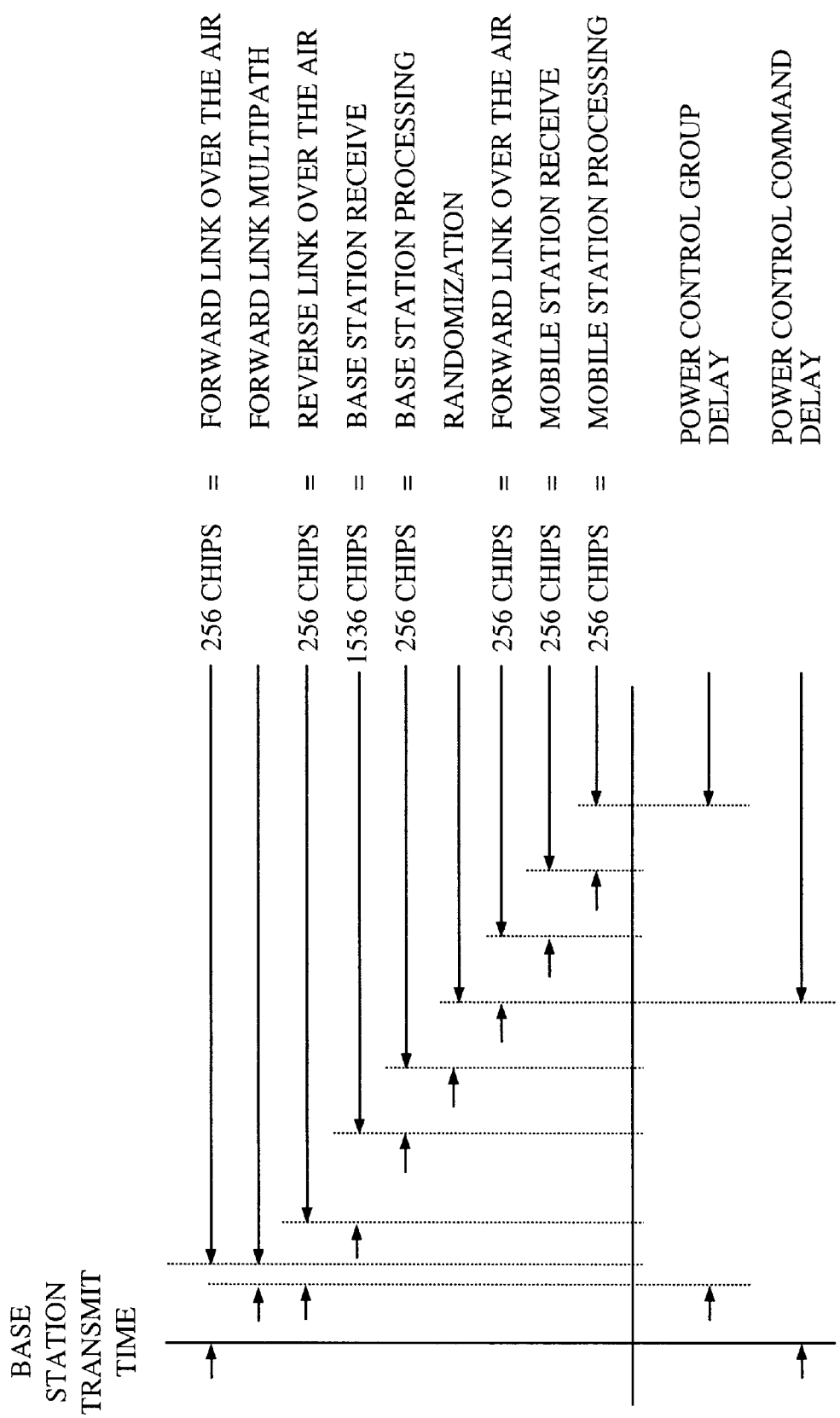
FIG. 9 is a diagram showing the timing of delays in a reverse link closed loop power control loop implemented in accordance with the present invention.

Referring now to FIG. 9, there is shown a diagram illustrating the timing of delays in the reverse link closed loop power control loop of the present invention. The reverse link closed link power control loop uses the forward link power control subchannels (described above in connection with FIGS. 6–8) to control the transmit power of the mobile stations on the reverse link. FIG. 9 summarizes the reverse link closed loop power control delay budget. Assuming a worst case round trip delay of 512 PN chips, it is safe to assume that the worst one way over the air delay is less than 256 PN chips. Since the maximum length power control bit is 2 PN-word (128 PN chips) in duration, the worst case mobile station receive time is 128 PN chips. An additional 256 PN chips (approximately 200 microseconds) is allocated for the mobile station to decode and act on the power control command. Since the base station measures the power in an entire power control group, the base station receive time is 1536 PN chips. An additional 256 PN chips (approximately 200 microseconds) is allocated for the base station to measure the received signal strength and turn around the power control command. Therefore, in the worst case, the power control command associated with the power control group n can be sent 768 PN chips before the start of power control group n+2 or 768 PN chips after the start of power control group n+1. In order to allow the same amount of randomization use for rate set 1 and 2, the rate set 3, 4, 5 and 6 power control commands are randomized over the last 12 PN-words of power control group n+1 and the first 4 PN-words of power control group n+2. This results in an average power control command delay of 1⅚ power control groups, including the measurement interval. In addition, it results in an average power control loop delay of 2⅙ power control groups, including the measurement interval.

The pilot channel used on the forward link in the present invention is the same as the pilot channel set forth in the IS-95-B standard, incorporated herein by reference. Thus, the pilot channel uses Walsh code $W_0^{64}=\{W_0^{128},W_{64}^{128}\}$ Although the pilot channel carries no data and is therefore effectively Walsh code $W_0^{128}$, not using Walsh code $W_0^{64}=\{W_0^{128},W_{64}^{128}\}$ would disable mobile stations that intergrate the pilot for less than 128 chips. Therefore, Walsh code $W_0^{64}=\{W_0^{128},W_{64}^{128}\}$ is used.

The sync channel used on the forward link in the present invention is the same as the sync channel set forth in the IS-95-B standard, incorporated herein by reference. Thus, the sync channel uses Walsh code $W_{32}^{64}=\{W_{32}^{128}, W_{96}^{128}\}$ In a CDMA system operating in accordance with the present invention, forward link power control (control of the power level of the traffic signal sent from the base station transceiver to a mobile station on the forward link) is generally driven by frame erasure information sent from the mobile station to the base station transceiver when the reverse link is operating in rate set 1. When the reverse link is rate set 2, forward link power control is also driven by frame erasure information sent from the mobile station to the base station transceiver. When the reverse link rate set is 3, 4, 5 or 6, however, forward link power control is driven by data representing the signal to noise ratio of forward traffic frames. When the reverse link rate set is 3, 4, 5 or 6, the forward link power control information is sent from the mobile station to the base station on a reverse link power control subchannel. As explained more fully below, the reverse link power control subchannel is created by puncturing the power control information into selected power control groups of the reverse pilot channel.

As mentioned above, forward link power control when the reverse link is rate set 3, 4, 5 or 6, is a frame signal to noise ratio based power control. By way of an overview, this forward link power control system functions as follows. Each frame, the mobile station measures the per symbol signal to noise ratio (Es/Nt) and subtracts from it the expected Es/Nt. The mobile station reports this signal to noise ratio delta (FWD_SNR_DELTA) to the base station on the reverse power control subchannel. The base station then uses this signal to noise ratio delta to adjust the transmit gain for the next frame, usually changing the transmit gain by a factor inversely proportional to the delta. During soft handoff, because base station transmit gains may become out of synchronization, the base station controller resynchronizes the base station transmit gains once per frame.

The mobile station preferably chooses the expected per symbol signal to noise ratio (Es/Nt) such that a target frame erasure rate (FWD_FER) is achieved while minimizing the required per symbol signal to noise ratio. In one embodiment, the mobile station generates the expected per symbol signal to noise ratio (Es/Nt) as follows. The mobile station sets the initial expected Es/Nt to the Es/Nt of the first frame that it successfully decodes. After that, the mobile station does the following for each frame. If the fundamental block is erased, then the mobile station increases the expected Es/Nt. Otherwise, the mobile station decreases the expected Es/Nt. As set forth in equations (3) and (4) below, the increase step size ($P_{increase}$) and decrease size ($P_{decrease}$) are governed by the desired forward link fundamental block erasure rate (FWD_FER) and the maximum desired expected Es/Nt rate of increase ($P_{increase, \, max}$);

$$P_{decrease} = \left(\frac{FWD\_FER}{FWD\_FER-1}\right)P_{increase/max} \qquad (3)$$

$$P_{increase} = \left(\frac{1}{FWD\_FER}\right)P_{decrease} \qquad (4)$$

where $P_{increase, \, max}=0.5$.

It will also be understood that other methods of calculating a signal representative of received signal strength may be utilized with the invention as well. For example, the mobile station may perform maximal ratio combining of the receive paths using the received pilot signal and the received traffic signal. The mobile station may also calculate the FWD_SNR_DELTA using normalized per frame expected and received signal to noise ratios.

As mentioned above, for forward link power control, the mobile station sends the resulting difference between the measured and expected values of the signal to noise ratio in decibels (FWD_SNR_DELTA) to the base station transceiver on the reverse link power control subchannel. Specifically, the FWD_SNR_DELTA for forward frame n−1 sent by the mobile station to the base station on the power control subchannel of reverse frame n. In accordance with one embodiment, Table 12 shows the relationship between the FWD_SNR_DELTA values transmitted by the mobile station, the per symbol signal to noise ratio (Es/Nt) measured by the mobile station for a frame, and the expected signal to noise ratio (Es/Nt) calculated by the mobile station.

TABLE 12

FWD_SNR_DELTA Transmit Mapping
FWD_SNR_DELTA

| (binary) | (decibels) Greater Than | Not Greater Than |
|---|---|---|
| 100 |  | −1.5 |
| 101 | −1.5 | −1.0 |
| 110 | −1.5 | −0.5 |
| 111 | −0.5 | 0.0 |
| 000 | 0.0 | +0.5 |
| 001 | +0.5 | +1.0 |
| 010 | +1.0 | .105 |
| 011 | +1.5 |  |

In preferred embodiment, the base station transceiver initially used the FWD_SNR_DELTA value sent to it by the mobile station on the power control subchannel of reverse frame n to adjust the forward gain (FWD_GAIN applies to forward frame n+1. If the power control subchannel FWD_SNR_DELTA is not erased by the base station, the "forward per symbol signal to noise ratio delta flag" (FWD_SNR_VALID) at the base station transceiver is set to 1. Otherwise, the base station transceiver will set both the FWD_SNR_DELTA and FWD_SNR_VALID values to 0.

Upon receipt at the base station transceiver, the FWD_SNR_DELTA is converted to a decibel value in accordance with Table 13 below:

TABLE 13

FWD_SNR_DELTA Receive Mapping
FWD_SNR_DELTA

| (binary) | (decibels) |
|---|---|
| 100 | −1.75 |
| 101 | −1.25 |
| 110 | −0.75 |
| 111 | −0.25 |
| 000 | +0.25 |
| 001 | +0.75 |
| 010 | +1.25 |
| 011 | +1.75 |

The forward gain initially applied by the base station transceiver transmitter to forward transmit frame n+1 is then calculated in accordance with equation (5) below:

$$FWD\_GAIN[n+1] = \begin{cases} FWD\_GAIN\_MIN, \text{ where } FWD\_GAIN_{adj} < FWD\_GAIN\_MIN \\ FWD\_GAIN\_MAX, \text{ where } FWD\_GAIN_{adj} > FWD\_GAIN\_MAX \\ FWD\_GAIN_{adj}, \text{ otherwise} \end{cases}$$

where $FWD\_GAIN_{adj}=FWD\_GAIN[N]*10^{-[\alpha/2\cdot(FWD\_SNR\_DELTA[n]+1/2)\cdot(FWD\_SNR\_VALID[n])]}$, $\alpha$ =damping factor that can be nominally equal to ⅙, and FWD_SNR_DELTA is assumed to be a 3 bit, twos complement number. It will be understood though, that other methods of calculating the FWD_GAIN are envisioned.

However, in cases such as a soft handoff where a mobile station is communicating with more than one of the transceivers in a sectorized base station, all the base station transceivers in active communication with the mobile station may not correctly decode the information contained in the reverse link power control subchannel transmitted by the mobile station. When this occurs, the FWD_GAIN applied by each of the sectorized transceivers in active communication with the mobile station may not be synchronized and may even diverge. Thus, a means of restoring the FWD_GAIN values to a synchronized state is needed to prevent the mobile station in soft handoff from experiencing undue difficulty in combining CDMA signals with divergent gains that have been transmitted with the same PN spreading code from each of the sectorized base station transmitters.

According to the invention, this asynchronization problem is solved as follows. First, as explained above, each sectorized base station transceiver uses any non-erased FWD_SNR_DELTA value sent to it by the mobile station on the power control subchannel of reverse frame n to adjust the forward gain (FWD_GAIN$_{actual}$) it applies to forward frame n+1 in accordance with equation (5) above. In addition, each sectorized base station transceiver sends the FWD_SNR_DELTA and FWD_SNR_VALID values that it received in connection with reverse frame n to the base station controller with the decoded traffic information. The base station controller then selects a single FWD_SNR_DELTA value from all the values it receives for reverse frame n from each sectorized transceiver as follows:

1. For all the cases where the FWD_SNR_VALID value received from the sector is 0, the corresponding FWD_SNR_DELTA value is discarded;
2. If any FWD_SNR_DELTA values remain, the base station controller selects the maximum FWD_SNR_DELTA;
3. If no FWD_SNR_DELTA values remain, the base station controller sets the FWD_SNR_DELTA and FWD_SNR_VALID values to 0.

The base station controller then sends the single FWD_SNR_DELTA value calculated in accordance with steps 1–3 above back to each sectorized base station transceiver, and each base station transceiver then calculates the FWD_GAIN value that should have been applied to forward frame n+1 by each of the sectorized base station transceivers (i.e., FWD_GAIN$_{target}$) by applying the single FWD_SNR_DELTA value calculated in accordance with steps 1–3 above to equation (5) above. Each sectorized base station transceiver then compares the FWD_GAIN$_{actual}$ that was previously applied to forward frame n+1 to the FWD_GAIN$_{target}$ value that should have been applied to forward frame n+1 (as determined in accordance with steps 1–3 above). The difference (FWD_GAIN$_{diff}$) between the FWD_GAIN$_{actual}$ and FWD_GAIN$_{target}$ values is applied to adjust up or down the gain applied to the next forward frame sent by each sectorized base station transceiver (this next frame is denoted frame n+2+Tbackhaul, where Tbackhaul represents the processing delay in frames for the base station controller to calculate FWD_GAIN$_{target}$ and send it back to the sectorized base station transceivers.) Thus, the forward gain applied by each sectorized base station transceiver during forward frame n+2+Tbackhaul will represent the sum of the FWD_GAIN$_{diff}$ value (that was calculated as described above using the FWD_SNR_DELTA values sent by the mobile station during reverse frame n) and a further FWD_GAIN$_{actual}$ value that is calculated by the sectorized base station transceiver using the FWD_SNR_DELTA value sent by the mobile station during reverse frame n+1+Tbackhaul.

In one embodiment, each base station transceiver send the FWD_SNR_DELTA and FWD_SNR_VALID values for each frame to the base station controller in a Reverse Traffic packet having the format shown in Table 14 below, and the base station controller send the FWD_GAIN$_{target}$ values discussed above for each frame to the base station transceivers in a Forward Traffic Packet having the format shown in Table 15 below:

TABLE 14

Base Station Reverse Traffic Packet Format

| Field | Length (bits) | Description |
|---|---|---|
| MSG_ID | 8 | Message Identification. |
| VCI | 8 | Virtual channel identifier. |
| QUALITY | 8 | Received frame quality indicator. |
| FWD_SNR_VALID | 1 | Indicates that the FWD_SNR_DELTA field is valid and was used by the base station transceiver to adjust the traffic channel gain. |
| FWD_SNR_DELTA | 3 | Forward per symbol signal to noise ratio delta. |
| RVS_SNR_VALID | 1 | Indicates that the RVS_SNR_DELTA field is valid. |
| RVS_SNR_DELTA | 3 | Reverse per symbol signal to noise ratio delta. |
| FRAME_SEQ | 4 | The frame sequence number. Set to the CDMA system time in unites of 20 milliseconds modulo 16. |
| FRAME_RATE | 4 | The rate of the traffic channel frame.<br>0 = Rate 1.<br>1 = Rate ½.<br>2 = Rate ¼.<br>3 = Rate ⅛.<br>4 = Erasure. |
| FRAME_DATA | 8 × FRAME_LEN | The IS-95 traffic channel frame payload. FRAME_LEN depends on FRAME_RATE and rate set. |

| Field | Length (bits) | Description |
|---|---|---|
| MSG_ID | 8 | Message Identification. |
| FWD_GAIN | 8 | The full rate forward digital gain at which this forward traffic frame is to be transmitted. |
| RVS_THRESH | 8 | The reverse link closed loop power control threshold in units of decibels. |
| FRAME_SEQ | 4 | The frame sequence number. Set to the CDMA system time in units of 20 milliseconds modulo 16. |
| FRAME_RATE | 4 | The rate of the traffic channel frame.<br>0 = Rate 1.<br>1 = Rate ½.<br>2 = Rate ¼.<br>3 = Rate ⅛.<br>4 = Null. |
| FRAME_DATA | 8 × FRAME_LEN | The IS-95 traffic channel frame payload. FRAME_LEN depends on FRAME_RATE and rate set. |

Figure 10:
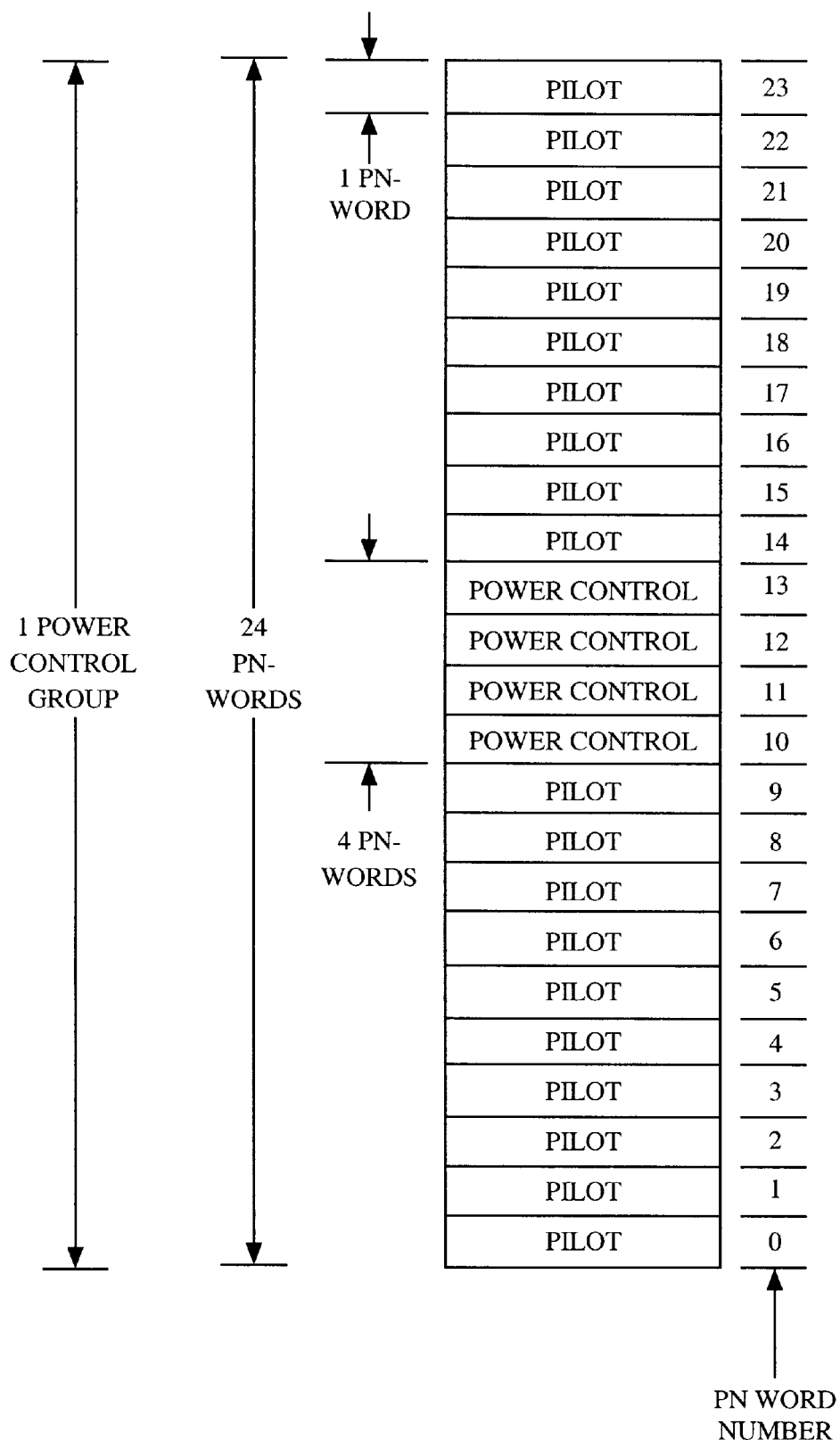
FIG. 10 is a block diagram showing the structure of a reverse link power control subchannel punctured into a reverse link pilot channel, in accordance with the present invention.

Referring now to FIG. 10, there is shown a block diagram of the reverse link power control subchannel which is punctured into selected power control groups in the reverse link pilot channel. As mentioned above, in rate sets 3, 4, 5 and 6, the difference between the expected and measured forward per symbol signal to noise ratio (FWD_SNR_DELTA) is sent from the mobile station once per frame on the reverse link power control subchannel. The reverse link power control subchannel is created by puncturing the 3-bit FWD_SNR_DELTA values into a fundamental block of the reverse pilot channel. More particularly, numbering the power control groups on the reverse pilot channel from 0, the power control subchannel is punctured into the pilot channel during power control groups 9, 10, 11, 12, 13 and 14. Each power control group is divided into 24 PN-words. Numbering the PN-words in a power control group from 0, the power control subchannel is punctured into PN-words 10, 11, 12 and 13 of power control groups 9, 10, 11, 12, 13 and 14. An exemplary power control group with the punctured reverse power control subchannel is shown in FIG. 10.

The reverse power control subchannel is punctured into power control groups 9, 10, 11, 12, 13 and 14 for the following reasons. First, the power control subchannel must be punctured into power control groups that are transmitted during gating. If the power control subchannel is not so positioned, then it would not be sent during gating. Therefore only power control groups 8, 9, 10, 11, 12, 13, 14 and 15 may be used. Second, the power control subchannel cannot be transmitted during the last power control group. If the power control subchannel were transmitted during the last power control group, then the base station would not be able to adjust the transmit level before the beginning of the next frame. Therefore only power control groups 8, 9, 10, 11, 12, 13, and 14 may be used. However, if seven power control groups are used, the numerology (shown in Table 14 below) will not work well. Therefore, six power control groups are used. Power control group 8 is not used in order to give the mobile station more time to determine FWD_SNR_DELTA. Finally, the power control subchannel is punctured into the center of the power control group in order to minimize the bias in the frequency and time tracking loops that are driven by estimators derived from block filters of the pilot over a power control group.

In a preferred embodiment, the FWD_SNR_DELTA values are transmitted on the reverse power control subchannel sent using bi-orthogonal modulation. The FWD_SNR_DELTA message is encoded into 1 bi-orthogonal symbol. The 3-bit value $t=t_2 t_1 t_0$, is mapped into the code work $(-1)^{12} W_{z_1 1_0}^{4}$. The code word is repeated 96 times. The code word rather than the modulation symbols are repeated in order to provide time diversity for the code symbols.

The numerology and performance of the reverse power control subchannel is shown in Table 16 below:

TALBE 16

Reverse Link Control Channel Numerology

| | | Value | |
|---|---|---|---|
| Item | Units | Pilot | Power Control |
| Channel Strength | Decibels | −21.2 | −21.2 |
| Channel Fraction | | ⅚ | ⅙ |
| Value Length | Bits | | 3 |
| Value Duration | power control groups | | 6 |

TALBE 16-continued

Reverse Link Control Channel Numerology

| Item | Units | Value Pilot | Power Control |
|---|---|---|---|
| Value Length | modulation symbol | | 384 |
| Walsh Code Length | chips | | 4 |
| Modulation Type | | | bi-orthogonal |
| Repeat Rate | | | 96 |
| Antenna Diversity | | 1 | 2 |
| Processing Gain | decibels | −0.8 | 30.1 |
| Eb/Nt | decibels | −22.0 | 8.9 |
| Bit Error Rate | bits/bit | | 243E-06 |

Figure 11:
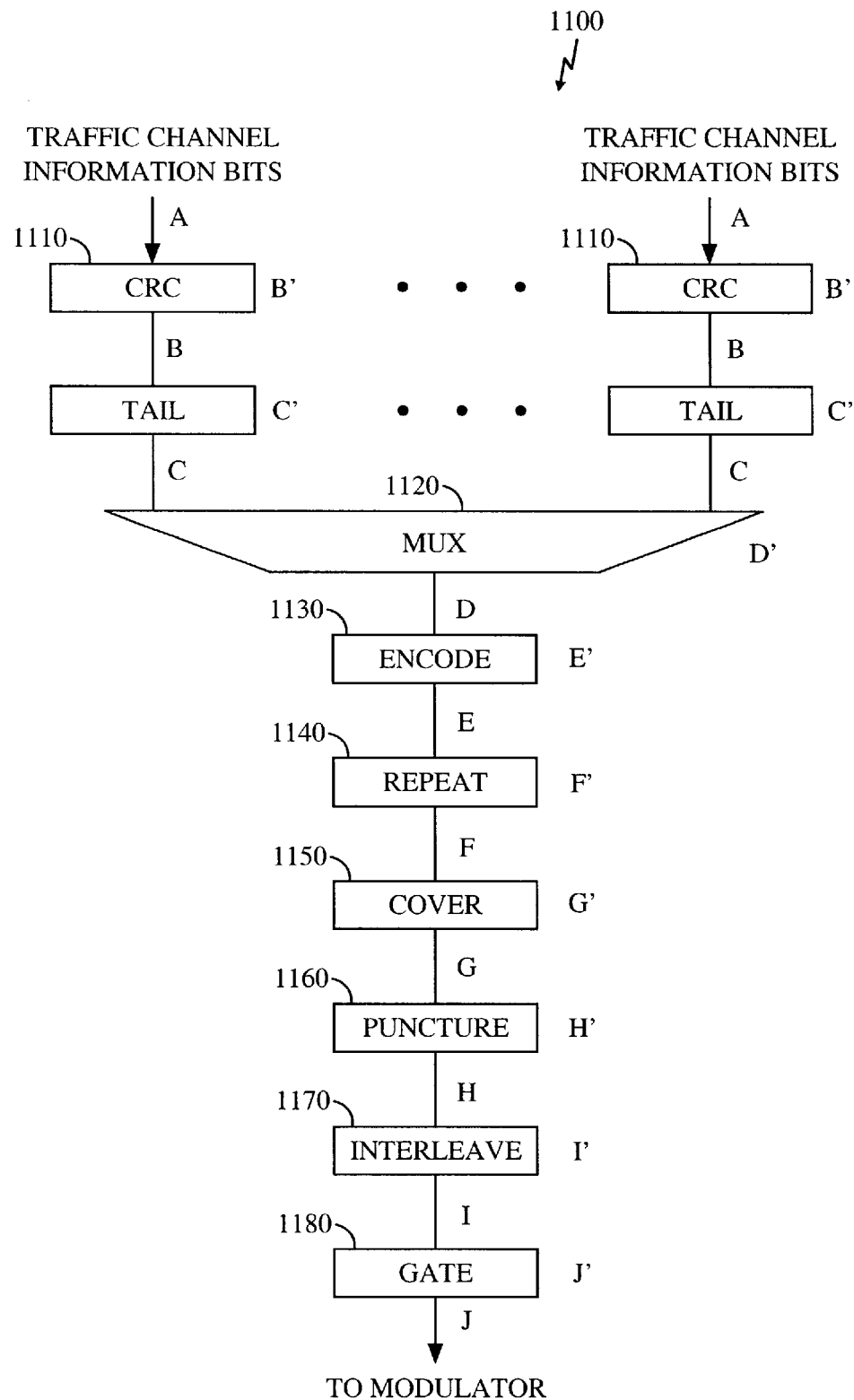
FIG. 11 shows an encoder for encoding the reverse link traffic channel information transmitted by a mobile station, in accordance with the present invention.

Referring now to FIG. 11, there is show a block diagram of an encoder 1100 for encoding the reverse link traffic channel information transmitted by a mobile station, in accordance with the present invention. Rate sets 3, 4, 5 and 6 support the transmission of reverse link channel rates ⅛, ¼, ½, 1, 2, 4 and 8. The rates above rate 1 are created by packing multiple rate blocks into a single frame. Encoding and interleaving is done over this packed frame. By way of overview, encoder 1100 takes as its input the reverse traffic information bits, appends a CRC, appends tail bits to block frame, encodes with a convolutional encoder, repeats to increase the symbol rate to at least 6144 symbols, Walsh covers to make the rates orthogonal, punctures to reduce the number of symbols to 6144, interleaves with a bit reversal block interleaver, and optionally gates off 50 percent of the symbols. The details of the reverse link encoder numerology for rate sets 3, 4, 5 and 6 are given in Tables 17–20 below:

TABLE 17

Reverse Link Encoder Numerology for Rate Sets 3, 5

| Item Rate | Units | Label | Value ⅛ | | ¼ | | ½ | | 1 |
|---|---|---|---|---|---|---|---|---|---|
| Info | bits/packet | A | 16 | 16 | 40 | 40 | 80 | 80 | 172 |
| CRC | bits/packet | B' | 0 | 0 | 0 | 0 | 8 | 8 | 12 |
| Tail | bits/packet | C' | 8 | 8 | 8 | 8 | 8 | 8 | 8 |
| Blocks | blocks/frame | D' | 1 | 1 | 1 | 1 | 1 | 1 | 1 |
| Bits | bits/frame | D | 24 | 24 | 28 | 28 | 96 | 96 | 192 |
| Encoder Rate | bits/symbols | E' | ¼ | ¼ | ¼ | ¼ | ¼ | ¼ | ¼ |
| Repeat Rate | symbols/symbols | F' | 646 | 64 | 32 | 32 | 16 | 16 | 8 |
| Puncture Rate | symbols/symbols | H' | 0 | 0 | 0 | 0 | 0 | 0 | 0 |
| Symbols | symbols/frame | H | 6144 | 6144 | 6144 | 6144 | 6144 | 6144 | 6144 |
| Gating Factor | symbols/symbols | J | ½ | 1 | ½ | 1 | ½ | 1 | 1 |
| Symbols | symbols/Frame | J' | 3072 | 6144 | 3072 | 6144 | 3072 | 6144 | 6144 |

TABLE 18

Reverse Link Encoder Numerology for Rate Sets 3 and 5 Medium Rate

| Item Rate | Units | Label | 2 | 4 | 8 |
|---|---|---|---|---|---|
| Info | bits/block | A | 172 | 172 | 172 |
| CRC | bits/Block | B' | 12 | 12 | 12 |
| Tail | bits/block | C' | 8 | 8 | 8 |
| Blocks | blocks/frame | D' | 2 | 4 | 8 |
| Bits | bits/frame | D | 384 | 768 | 1536 |
| Encoder Rate | bits/symbols | E' | ¼ | ¼ | ¼ |
| Repeat Rate | symbols/symbols | F' | 4 | 2 | 1 |
| Puncture Rate | symbols/symbols | H' | 0 | 0 | 0 |
| Symbols | symbols/frame | H | 6144 | 6144 | 6144 |
| Gating Factor | symbols/Symbols | J | 1 | 1 | 1 |
| Symbols | symbols/frame | J' | 6144 | 6144 | 6144 |

TABLE 19

Reverse Link Encoder Numerology for Rate Sets 4, 6

| Item Rate | Units | Label | Value 1/8 | | 1/4 | | 1/2 | | 1 |
|---|---|---|---|---|---|---|---|---|---|
| Info | bits/block | A | 22 | 22 | 56 | 56 | 126 | 126 | 268 |
| CRC | bits/block | B' | 6 | 6 | 8 | 8 | 10 | 10 | 12 |
| Tail | bits/block | C' | 8 | 8 | 8 | 8 | 8 | 8 | 8 |
| Blocks | blocks/frame | D' | 1 | 1 | 1 | 1 | 1 | 1 | 1 |
| Bits | bits/frame | D | 36 | 36 | 72 | 72 | 144 | 144 | 288 |
| Encoder Rate | bits/symbols | E' | 1/4 | 1/4 | 1/4 | 1/4 | 1/4 | 1/4 | 1/4 |
| Repeat Rate | symbols/symbol | F' | 64 | 64 | 32 | 32 | 16 | 16 | 8 |
| Puncture Rate | symbols/symbol | H' | 1/3 | 1/3 | 1/3 | 1/3 | 1/3 | 1/3 | 1/3 |
| Symbols | symbols/frame | H | 6144 | 6144 | 6144 | 6144 | 6144 | 6144 | 6144 |
| Gating Factor | symbols/symbol | I | 1/2 | 1 | 1/2 | 1 | 1/2 | 1 | 1 |
| Symbols | symbols/Frame | J' | 3072 | 6144 | 3072 | 6144 | 3072 | 6144 | 6144 |

TABLE 20

Reverse Link Encoder Numerology for Rate Sets 4 and 6 Medium Data Rate

| Item Rate | Units | Label | 2 | 4 | 8 |
|---|---|---|---|---|---|
| Info | bits/block | A | 268 | 268 | 268 |

TABLE 20-continued

Reverse Link Encoder Numerology for Rate Sets 4 and 6 Medium Data Rate

| Item Rate | Units | Label | 2 | 4 | 8 |
|---|---|---|---|---|---|
| CRC | bits/block | B' | 12 | 12 | 12 |
| Tail | bits/block | C' | 8 | 8 | 8 |
| Blocks | blocks/frame | D' | 2 | 4 | 8 |
| Bits | bits/frame | D | 576 | 1152 | 2304 |
| Encoder Rate | bits/symbols | E' | ¼ | ¼ | ¼ |
| Repeat Rate | symbols/symbols | F' | 4 | 2 | 1 |
| Puncture Rate | symbols/symbols | H' | ⅓ | ⅓ | ⅓ |
| Symbols | symbols/frame | H | 6144 | 6144 | 6144 |
| Gating Factor | symbols/symbols | J | 1 | 1 | 1 |
| Symbols | symbols/frame | J' | 6144 | 6144 | 6144 |

In a preferred embodiment, the rate set 3 and 5 blocks contain the same number of information bits as the rate set 1 blocks, and the rate set 4 and 6 blocks contain the same number of information bits as the rate set 2 blocks.

Referring still to FIG. 11, CRC blocks 1110 append CRC bits to the input information blocks as follows. The rate set 1, 3 and 5 blocks have 8-bit and 12-bit CRCs on the rate ½ and rate 1 blocks, respectively. The rate set 2, 4 and 6 blocks have 6-bit, 8-bit, 10-bit and 12-bit CRCs on the rate ⅛, rate ¼, rate ½ and rate 1 blocks respectively. The polynomials used for generating the CRC bits are shown in Table 21 below. Initially, the CRC generators used are loaded with all 1's.

TABLE 21

Reverse Link CRC Generators

| Rate | Generator (octal) Rate Set 1, 3 and 5 | Polynomial Rate Set 2, 4 and 6 |
|---|---|---|
| ⅛ | | 0107 |
| ¼ | | 0633 |
| ½ | 0633 | 03731 |
| 1 | 017423 | 017423 |

After the CRC bits are added to the input information blocks and tail bits are appended to block code, the output of multiplexer 1120 is alternatively provided to one of three convolutional encoders 1130 depending on the rate set being used. The rate set 1 convolutional encoder is a constraint length 9, rate ⅓ convolutional encoder. The rate set 2 convolutional encoder is a constraint length 9, rate ½ convolutional encoder. The rate set 3, 4, 5 and 6 convolutional encoder is a constraint length 9, rate ¼, convolutional encoder. The generator functions for the three encoders 1130 are shown in Table 22 below, and the minimum free distances for the encoders are shown in Table 23 below.

TABLE 22

Reverse Link Convolutional Encoder Generators

| Symbol | Generator Function (Octal) Rate Set 1 | Rate Set 2 | Rate Set 3, 4, 5 and 6 |
|---|---|---|---|
| 0 | 557 | 0753 | 0765 |
| 1 | 663 | 0561 | 0671 |
| 2 | 711 | | 0513 |
| 3 | | | 0473 |

TABLE 23

Reverse Link Convolutional Encoder Minimum Free Distance

| Rate Set 1 | Rate Set 2 | Rate Set 3, 4, 5 and 6 |
|---|---|---|
| 18 | 12 | 24 |

Encoder 1130 is blocked on a per-block basis by initializing the encoder state with zero and tailing every block with an 8-bit zero encoder tail.

The output of encoder 1130 is provided to symbol repetition unit 1140, which repeats the symbols 64, 32, 16, 8, 4, 2 and 1 times for the rate ⅛, rate ¼, rate ½, rate 1, rate 2, rate 4, and rate 8 blocks, respectively.

After the symbols are repeated, they are provided to covering unit 1150, where the rate set 3, 4, 5 and 6 symbols are covered with a rate dependent Walsh code running at the symbol rate. The rate dependent Walsh code is $W_{r/2}^{r}$, where $W_{x}^{n}$ represents the Walsh code x of an n-ary Walsh code space and R represents the symbol repetition rate. The Walsh codes chosen are from a 64-ary Walsh code space.

For rate sets 2, 4 and 6, the block has 50 percent more symbols than the rate set 1, 3 and 5 blocks, respectively. In order to reduce the number of symbols so that a rate set 2, 4 or 6 block can be transmitted using the same number of symbols as a rate set 1, 3 or 5 block, the symbol stream must be punctured. Thus, the output of covering unit 1150 is provided to puncturing unit 1160. The puncture patterns used by puncture unit 1160 are shown in Table 24, where a 1 means transmit the symbol and a 0 means puncture the symbol.

TABLE 24

Reverse Link Encoder Puncture Patterns

| Rate | Puncture Pattern (binary) Rate Set 1, 3 and 5 | Rate Set 2 | Rate Set 4 and 6 |
|---|---|---|---|
| ⅛ | | 110101 | 110110011011 |
| ¼ | | 110101 | 110110011011 |
| ½ | | 110101 | 110110011011 |
| 1 | | 110101 | 110110011011 |

The output of puncture unit 1160 is alternatively provided to one of two interleavers 1170 depending on the rate set being used. The rate set 1 and 2 interleaver is the same as the interleaver for rate set 1 and 2 described in the IS-95B standard, incorporated herein by reference. The rate set 3, 4, 5 and 6 interleaver is a bit reversal block interleaver with 128 rows and 48 columns. The interleaver is written column first, using a column counter in order. The interleaver is read row first, using a row counter in bit reversed order. That is, if the row counter indicates $b_6b_5b_4b_3b_2b_0$, then the row $b_0b_1b_2b_3b4b_5b_6$ is read.

The output of interleaver 1170 is provided to a gating unit 1180. In the present invention, gating is supported for rate sets 3, 4, 5 and 6. When a frame is gated, only the symbols within the second half of the frame are transmitted. During gating, the maximum frame rate is rate ½. Normally, the traffic information frames are transmitted on the reverse link using continuous transmission, with the exception of the ⅛ frame which is gated. However, rate sets 3, 4, 5 and 6 may be commanded into a mode where only rate ⅛, rate ¼ and rate ½ frames are transmitted, and they are transmitted using gated transmission. This mode is used to allow the mobile station time to retune its receiver and search for systems using other frequencies and/or other technologies (in particular AMPS and GSM). A mobile station commanded into gated mode for searching will be commanded to gate N frames out of M frames, starting at system time T. The values of N and M depend on the technology being searched and the number of channels being searched. This gating is synchronous with the forward link gating.

Figure 12:
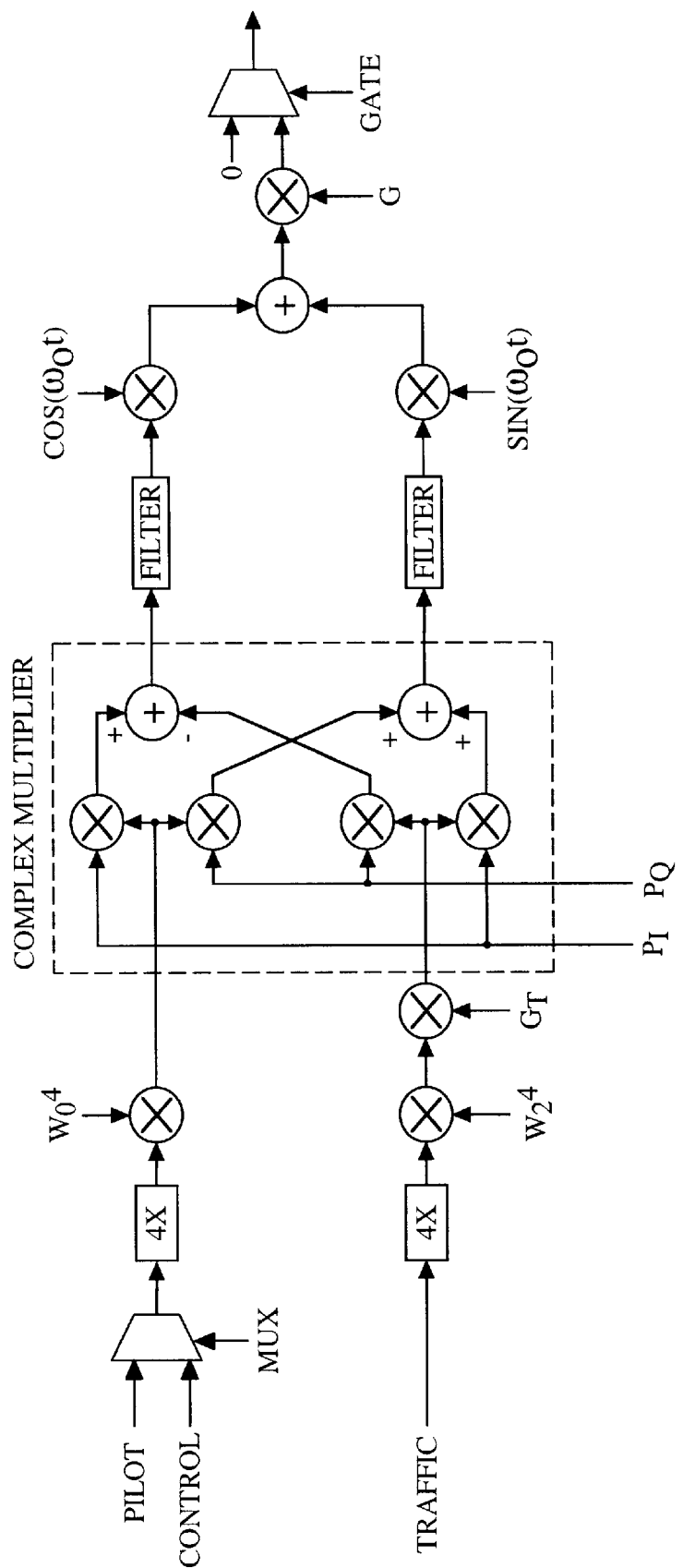
FIGS. 12 and 13 show two views of a modulator for modulating the reverse link pilot, control and traffic channels, in accordance with the present invention.
Figure 13:
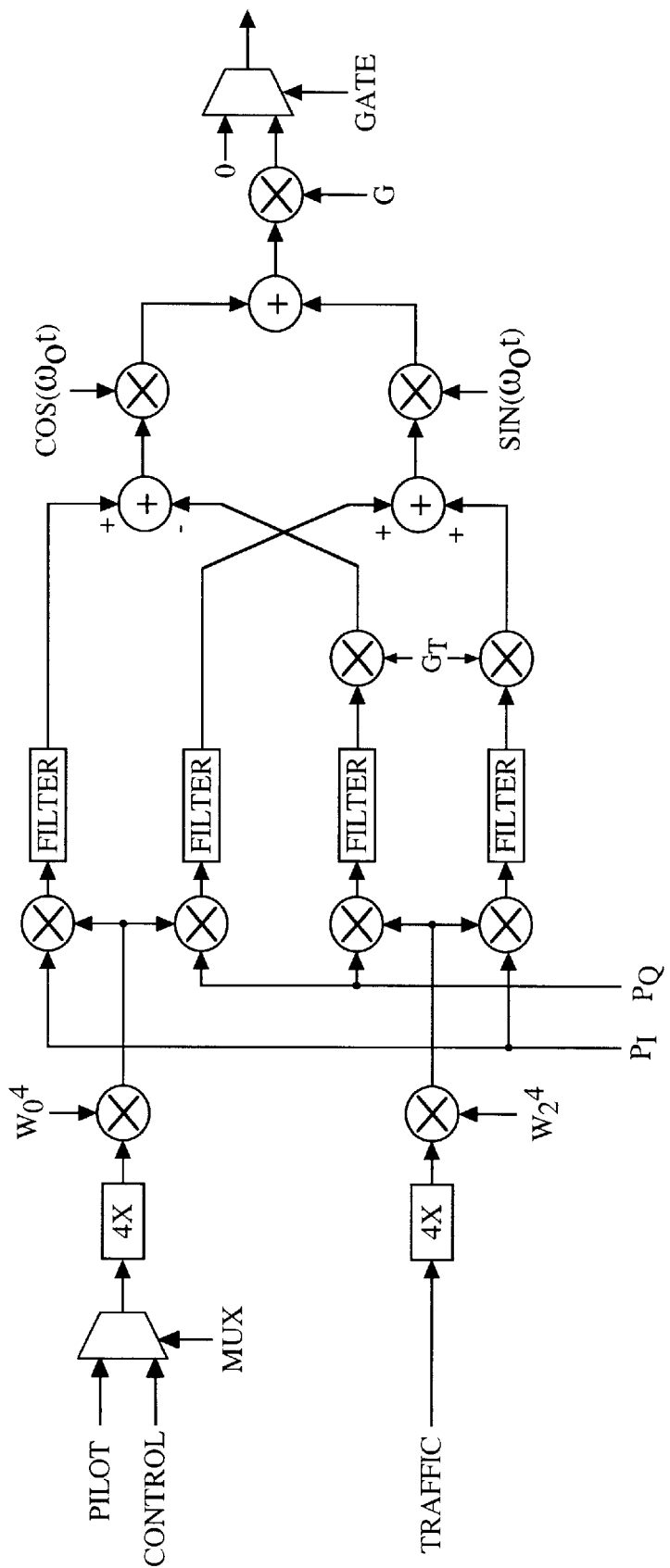

FIGS. 12 and 13 show two views of a modulator for modulating the reverse link pilot, control and traffic channels, in accordance with the present invention. The reverse traffic channel information provided to the modulators in FIGS. 12 and 13 corresponds to the output of encoder 1100.

In the present invention, power control on the reverse link (i.e., control of the transmit power of transmissions from the mobile station to a base station), is performed as follows. The base station measures the pilot signal to interference ratio (Ep/Io) of the reverse pilot over a power control group. This value is compared to a threshold. If the Ep/Io value is more than 0.5 decibels below the threshold, then the base station sends a symbol representing a power-up command to the mobile station (i.e., a command indicating that the mobile station should increase its transmit power by a predetermined amount.) If the Ep/Io value is within 0.5 decibels of the threshold, then the base station sends a symbol representing a power hold command to the mobile station (i.e., a command indicating that the mobile station should hold its transmit power constant.) If the Ep/Io value is more than 0.5 decibels above the threshold, then the base station sends a symbol representing a down command to the mobile station (i.e., a command indicating that the mobile station should decrease its transmit power by a predetermined amount.) The power up, power down and power hold commands are sent by the base station on the forward link power control subchannel discussed above.

The mobile station determines what to action perform by choosing the power control command received that will result in the lowest transmit power. Thus, if any base station sends a down command to the mobile station, then the mobile station will turn down its transmit power. If any base station sends a hold command and no base station sends a down command, then the mobile station will not change its transmit power. If all base stations send up commands, then the mobile station will turn up its transmitter.

The foregoing description of the preferred embodiments of this invention is provided to enable a person of ordinary skill in the art to make or use the invention claimed herein. The various modifications to these embodiments will be readily apparent to those skilled in the art, and the principles described may be applied to other embodiments without the use of any inventive faculty. Therefore, the present invention is not to be limited to the specific embodiments disclosed but is to be accorded the widest scope consistent with the principles and novel features disclosed herein.

What is claimed is:

1. In a telephone system having a base station controller associated with a sectorized cell, a first base station transceiver associated with a first sector of the cell and a second base station transceiver associated with a second sector of the cell, and a mobile station, a method for controlling the transmit power level of the first and second base station transceivers, comprising the steps of:

(a) determining the received signal strength of a communication signal arriving at the mobile station;

(b) transmitting a power control value based on the received signal strength to the first base station transceiver and the second base station transceiver;

(c) generating a first received power control value by attempting to receive the transmitted power control value at the first base station transceiver;

(d) generating a second received power control value by attempting to receive the transmitted power control value transmitted from the mobile station at the second base station transceiver;

(e) calculating, at the base station controller, a common transmit power value for the transceivers if the first and second received power control values are unequal; and (f) transmitting the communication signal from the first and second based station transceivers in accordance with the common transmit power value.

2. The method of claim 1, wherein the received signal strength is determined by measuring the difference between an expected signal to noise ratio and an actual signal to noise ratio.

3. The method of claim 1, wherein the mobile station also communicates to the controller whether the received signal strength is valid.

4. The method of claim 3, wherein the common transmit power value is not changed if no received signal strength is valid.

5. The method of claim 1, wherein the received signal strength communicated to the controller with a reverse frame n is used by the controller to generate the common transmit power value communicated to the first and second base station transceivers for a forward frame n+2+Tbackhaul, where Tbackhaul represents a processing delay in frames caused by the base controller.

6. The method of claim 1, wherein the common transmit power value corresponds to a gain applied to the communication signal sent from the first and second base station transceivers.

7. The method of claim 1, wherein step (c) further comprises adjusting, during a first frame, a gain of the communication signal transmitted from the first base station transceiver in accordance with the first received power control value, and step (f) further comprises adjusting, during a second frame subsequent to the first frame, the gain of the communication signal transmitted from the first base station transceiver in accordance with a difference between the common transmit power value and the first received power control value.

8. The method of claim 7, wherein step (c) further comprises adjusting, during the first frame, a gain of the communication signal transmitted from the second base station transceiver in accordance with the second received power control value, and step (f) further comprises adjusting, during the second frame subsequent to the first frame, the gain of the communication signal transmitted from the second base station transceiver in accordance with a difference between the common transmit power value and the second received power control value.

9. In a cellular communication system having a base station controller associated with a sectorized cell, a first base station transceiver associated with a first sector of the cell and a second base station transceiver associated with a second sector of the cell, and a mobile station, an apparatus for controlling the transmit power level of the first and second base station transceivers, comprising:

(a) means for determining the received signal strength of a communication signal arriving at the mobile station;

(b) means for transmitting a power control value based on the received signal strength to the first base station transceiver and the second base station transceiver;

(c) means for generating a first received power control value by attempting to receive the power control value transmitted from the mobile station at the first base station transceiver;

(d) means for generating a second received power control value by attempting to receive the power control value transmitted from the mobile station at the second base station transceiver;

(e) means for calculating at the base station controller, a common transmit power value for the first and second base station transceivers if the first and second received power control values are unequal; and (f) means for transmitting the communication signal from the first and second base station transceivers in accordance with the common transmit power value.

10. In a cellular or personal communication system having a base station controller associated with a sectorized cell, a first base station transceiver associated with a first sector of the cell and a second base station transceiver associated with a second sector of the cell transceiver, and a mobile station, an apparatus for controlling the transmit power level of the first and second base station transceivers, comprising:

(a) a processor in the mobile station that determines the received signal strength of a communication signal arriving at the mobile station;

(b) a transmitter that transmits a power control value based on the received signal strength to the first base station transceiver and the second base station transceiver;

(c) a processor in the first receiver that generates a first received power control value in response to the power control value transmitted from the mobile station;

(d) a processor in the second receiver that generates a second received power control value in response to the power control value transmitted from the mobile station;

(e) processing circuitry in the base station controller that generates a common transmit power value for the first and second base station transceivers if the first and second received power control values are unequal; and (f) a transmitter in the first base station transceiver and a transmitter in the second base station transmitter that transmit the communication signal in accordance with the common transmit power value.

* * * * *